US007835719B1

(12) United States Patent
Francis et al.

(10) Patent No.: US 7,835,719 B1
(45) Date of Patent: Nov. 16, 2010

(54) DETECTION OF SIGNALS IN A RADIO NETWORK

(75) Inventors: James Covosso Francis, Fairport, NY (US); Christopher Robert Brown, Fairport, NY (US); Howard Glen Ebersman, Rochester, NY (US); John Edward Gorton, Webster, NY (US); David Mark Smith, Rochester, NY (US); James Robert Tiffany, Bloomfield, NY (US)

(73) Assignee: L-3 Communications Titan Corporation, San Diego, CA (US)

( * ) Notice: Subject to any disclaimer, the term of this patent is extended or adjusted under 35 U.S.C. 154(b) by 784 days.

(21) Appl. No.: 11/803,554

(22) Filed: May 14, 2007

(51) Int. Cl.
*H04M 11/00* (2006.01)
(52) U.S. Cl. ............ 455/403; 455/562.1; 375/150
(58) Field of Classification Search ................. None
See application file for complete search history.

(56) References Cited

U.S. PATENT DOCUMENTS 5,233,626 A    8/1993   Ames

2001/0004380 A1*  6/2001  Mannermaa ............. 375/150
2004/0131025 A1   7/2004  Dohler et al.
2008/0287164 A1* 11/2008  Francis .................. 455/562.1

OTHER PUBLICATIONS

Stromberg, F., "Virtual Antenna Arrays Results and Ongoing Studies", Radio Communications Systems Lab. Department of Signals, Sensors and Systems, Royal Institute of Technology (KTH), SE-164 40 Kista Sweden. www.wireless.kth.se/AWSI/LCI/publication_files/Fredrik.pdf.

* cited by examiner

*Primary Examiner*—Erika A Gary
(74) *Attorney, Agent, or Firm*—Edward W. Callan

(57) ABSTRACT

In a radio network that includes at least one base station and at least one remote station, signals are modulated for transmission from the remote stations by embedding known information throughout the signal in a predetermined pattern and a group of sample vectors of a signal received by at least one base station of the network are collected and processed to detect a said received signal that resulted from propagation of a signal from a remote station of the network. The group of sample vectors is collected from (a) signals that are received by more than one base station of the network; and/or (b) signals that are received simultaneously at different frequencies by at least one base station of the network.

33 Claims, 12 Drawing Sheets

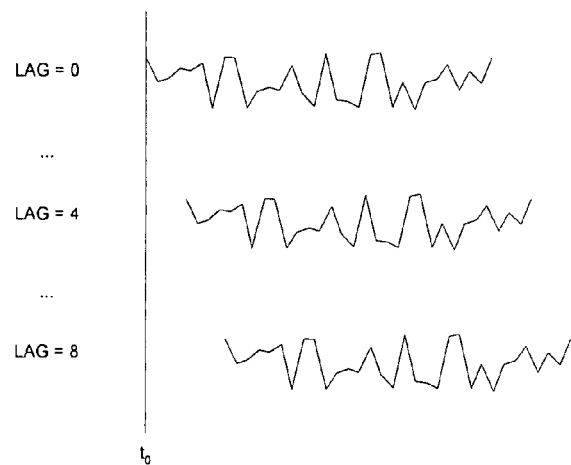
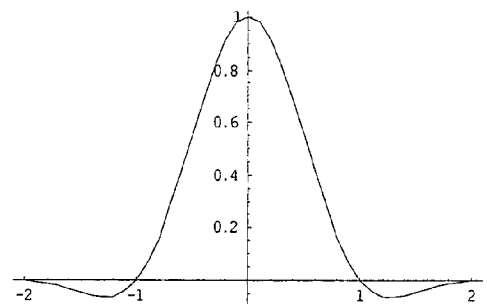
FIG. 6　　　　　　　　　　　FIG. 7
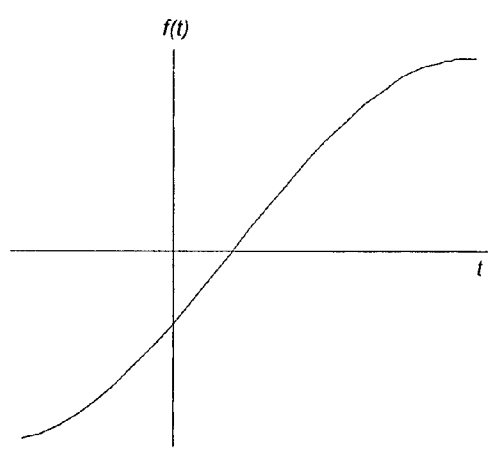
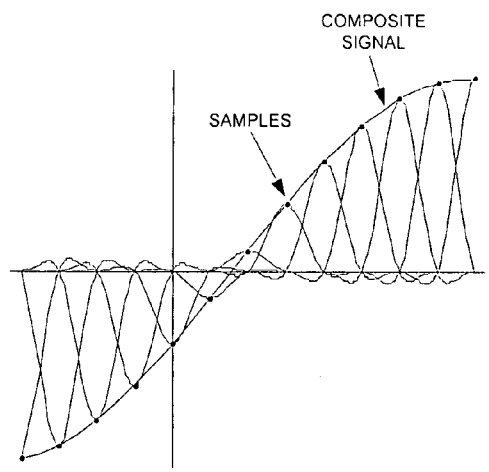
FIG. 8A　　　　　　　　　　FIG. 8B

DETECTION OF SIGNALS IN A RADIO NETWORK

BACKGROUND OF THE INVENTION

The present invention generally pertains to signal processing for a radio network of the type that includes at least one base station and at least one remote station and is particularly directed to processing signals received by a base station of the network to facilitate detection of received signals that resulted from propagation of signals transmitted by a remote station of the network.

This type of radio network is used for voice communications and for sending data. Typically the base stations of such a radio network are located at various, relatively stationary locations; and the remote stations are portable. A cellular radio network is an example of this type of radio network.

Each station of the network includes a radio device, such as a transceiver, and one or more signal processors for processing voice and/or data signals for transmission by the radio device and for processing signals received by the radio device in order to reconstruct voice and/or data signals from the received signals. Each station may be connected to one or more communication devices that are external to the radio network.

Communications within such radio networks are between remote stations and base stations, between different remote stations either directly or via one or more base stations, and between different base stations. The base stations control communications with each other and between the base stations and the remote stations.

Communications between base stations and remote stations are accomplished by the transmission of modulated signals over selected frequency channels. Because of the portability and limited size of the remote stations, signals transmitted over uplinks from remote stations sometimes are of relatively low power and thereby more distorted and difficult to detect than signals transmitted from base stations.

The uplink signals are distorted by frequency errors that result from propagation of the transmitted signals over the distance from the remote station to a base station. The frequency error is a function of the transmission path, relative motion between transmitter and receiver as well as any error in the frequency reference of the physical hardware. The uplink signals are also distorted by channel error effects, which are caused by background noise and time-varying multi-path attenuation and reflection of the transmitted signals.

Communications among a set of base stations within a particular radio network are conducted over a relatively high-power, more reliable communication link than the uplink from a remote station to the base station and thereby are not significantly affected by the distortions that are caused by propagation of the relatively low-power signals over the uplink from a remote station to a base station.

A signal processor is coupled to the base station for processing received signals in order to detect signals that resulted from propagation of signals transmitted by a remote station of the network. It is known to modulate signals for such transmission by embedding known information throughout the signals in a predetermined pattern; to encode signals for transmission from the remote stations of a particular radio network by processing the signals with a first feature, such as a pseudorandom number (PN); to process sample vectors of signals received by a base station of the network with a second feature that is related to the first feature, such as the conjugate of the PN used for encoding, in order to provide correlates of the sample vectors of the received signals; and to process the correlates with the known information in order to estimate whether the received signals resulted from propagation of a signal transmitted from a remote station in the particular network.

A signal is a particular sequence of modulated symbols that represent a message. A sample vector of a signal is a temporal sequence of measured values of the signal sampled over a predetermined duration.

It also is known to process the correlates of the signals to estimate frequency errors in the received signal and provide information sequences for the correlates that are corrected in accordance with the estimated frequency error. The corrected information sequences are processed to estimate any channel error effects in the received signal; and the corrected information sequences are compensated for the estimated channel error effects.

SUMMARY OF THE INVENTION

In one aspect, the present invention provides a method of communicating between stations in a radio network that includes at least one base station and at least one remote station, comprising the steps of:

(a) modulating a signal for transmission by embedding known information throughout the signal in a predetermined pattern;

(b) transmitting the modulated signal from a remote station of the network to at least one base station of the network;

(c) collecting a group of sample vectors of a signal received by at least one base station of the network; and (d) processing the collected sample vectors with the known information in the predetermined embedding pattern in order to detect a said received signal that resulted from propagation of the transmitted signal;

wherein step (c) comprises the step of:

(e) collecting the group of sample vectors from signals that are received by more than one base station of the network; and/or the step of:

(f) collecting the group of sample vectors from signals that are received simultaneously at different frequencies by at least one base station of the network.

The present invention also provides a system for collecting and processing signals communicated between stations in a radio network in accordance with the method of this one aspect of the present invention.

In another aspect, the present invention provides a method of communicating between stations in a radio network that includes at least one base station and at least one remote station, comprising the steps of:

(a) modulating a signal for transmission by embedding known information throughout the signal in a predetermined pattern;

(b) encoding the signal for transmission from a remote station of the network of the network by processing the signal with a first feature;

(c) transmitting the modulated and encoded signal from the remote station of the network;

(d) collecting a group of sample vectors of a signal received by at least one base station of the network;

(e) processing the collected sample vectors of the received signal with a second feature that is related to the first feature in order to provide correlates of the received signal;

(f) processing portions of a said correlate that occupy positions in the correlate corresponding to the positions of the known information in the modulated signal to estimate a frequency error present in the received signal and to provide a corrected known information sequence in accordance with the estimated frequency error; and (g) processing the corrected known information sequence for the correlate to estimate whether a particular said correlate resulted from propagation from a remote station of the network of a signal that was modulated for transmission by embedding the known information throughout the signal in the predetermined pattern.

The present invention also provides a system for processing a group of sample vectors of signals collected from at least one base station of a radio network in accordance with the method of this other aspect of the present invention.

The present invention further provides a computer readable medium for use with one or more computers in a system for processing a group of sample vectors of signals collected from at least one base station of a radio network in accordance with the method of this other aspect of the present invention.

As used herein, the term computer readable medium is not limited to one computer readable medium, but may also be interpreted to mean a plurality of computer readable media.

In a preferred embodiment, the modulated signals are encoded for transmission from the remote stations by being processed with a complex PN sequence. An ensemble of sample vectors including time-lagged sample vectors and the original non-lagged sample is provided for each of the collected sample vectors; and each of the lagged and non-lagged sample vectors is processed with a conjugate of the complex PN sequence to provide a set of correlates. Each collected sample vector is a temporal sequence of measured complex values of the received signal sampled over a predetermined duration.

For each correlate, portions of the correlate that occupy positions corresponding to the positions of the known information in the modulated signal are processed to estimate a frequency error present in the received signal and to provide a corrected known information sequence in accordance with the estimated frequency error; and the corrected known information sequence is processed to estimate whether a particular correlate resulted from propagation from a remote station of the network of a signal that was modulated for transmission by embedding the known information throughout the signal in the predetermined pattern.

When it is estimated that the particular correlate resulted from propagation of the signal from a remote station of the network, the particular correlate is further processed to provide a frequency-error-corrected unknown information sequence. Residual error indications for all of the particular correlates of all of the sample vectors for which it is estimated that the particular correlate resulted from propagation of the modulated signal from a remote station of the network are computed and accumulated and compared to select the frequency-error-corrected unknown information sequence for one particular correlate for providing the unknown information from the received signal.

Additional features of the present invention are described with reference to the detailed description of the preferred embodiments.

BRIEF DESCRIPTION OF THE DRAWING

FIG. 6 shows the alignment of received signal with different lag times in relation to the beginning at time $t_0$ of a complex sequence associated with the first known symbol block of the signal.

FIG. 7 is a plot of a Sinc function for the x values from −2 to 2.

FIG. 8A shows an arbitrary bandlimited representative function.

FIG. 8B shows the arbitrary bandlimited representative function of FIG. 8A superimposed over a sequence of samples.

DETAILED DESCRIPTION

Figure 1:
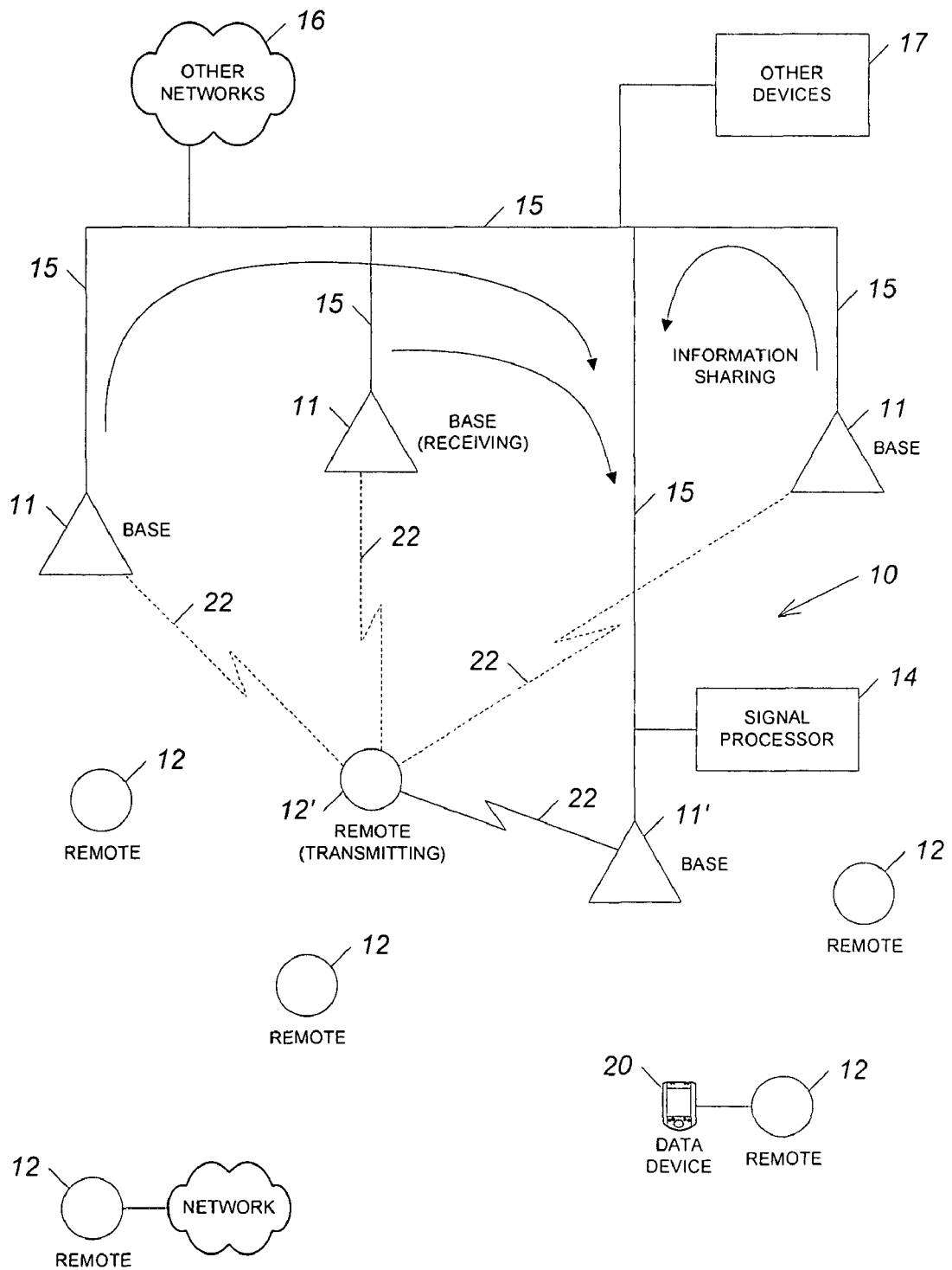
FIG. 1 is a diagram of one embodiment of a radio network in which communications are conducted in accordance with the present invention.

Referring to FIG. 1, an exemplary embodiment of a radio network 10 according to the present invention includes a plurality of base stations 11, a plurality of remote stations 12, 12' and a signal processor 14, which preferably is located at one of the base stations 11'. The particular base station 11' at which the signal processor 14 is located is coupled to the other base stations 11 by reliable communication links 15, such as a landline network, satellite radio or terrestrial radio.

At least a portion of the signal processor 14 is embodied in one or more computers. A computer readable medium, which is provided for use with the computer(s), contains program instructions for causing the computer(s) to perform one or more functions of the signal processor 14. As used herein, the term computer readable medium is not limited to one computer readable medium, but may also be interpreted to mean a plurality of computer readable media.

Other networks 16 and other devices 17 are also coupled to the base stations 11, 11' by the data communication links 15. Some of individual remote stations 12 are coupled to a network 19 other than the radio network 10 and/or a data device 20. Alternatively, the signal processor 14 can be located apart from all of the base stations 11, 11'.

Each of the base stations 11, 11' and remote stations 12, 12' includes a radio device, such as transceiver, and a signal processor coupled to the radio device. The radio device in the remote stations 12, 12' may be a portable radio, a system chassis with radio components, processing components and interfaces, or a radio coupled with an external processor.

The radio devices in the base stations 11, 11' and remote stations 12, 12' of the network 10 are capable of sharing information with their respective signal processors and each other as necessary. The information is shared over an external interface. The interface can source and/or sink information at one or more points within the processing architecture of the radio. For example, the information may consist of any combination of "baseband" IF, user data and audio sample vectors. An external processor can therefore assume an arbitrary amount of the processing load required to implement a capability. Further, the external interface can be used to control every aspect of the hardware behavior and configuration.

In the preferred embodiments the signals that are transmitted by the remote stations 12, 12' are transmitted as a series of signal bursts. In other embodiments the transmitted signal may be continuous.

An Automatic Link Establishment (ALE) computer-controlled protocol is used to automate the process of selecting and establishing communications between transceivers in the network 10 from among a set of frequencies. The current state of the art is referred to as "3G ALE". An Automatic Repeat reQuest (ARQ) protocol, or a hybrid ARQ protocol is used in the network 10 for reliable transmission of information during and after establishment of communications. These protocols are preferred for radio network communications in the HF band.

The network's control and processing takes place within a framework of sequential, multi-carrier signal transmissions.

Signals transmitted by the remote stations 12, 12' of the network 10 are propagated to the base stations 11, 11' over uplinks, such as uplinks 22 from a particular remote station 12'. An individual signal is modulated for such a transmission by embedding known information throughout the signal in a predetermined pattern.

In one embodiment, a group of sample vectors is collected from signals that are received by more than one base station 11, 11' of the network 10 and delivered to the signal processor 14 for processing. In another embodiment, a group of sample vectors is collected from signals that are received simultaneously at different frequencies by at least one base station 11, 11' of the network 10 and delivered to the signal processor 14 for processing. In still another embodiment, the group of sample vectors of a received signal that is delivered to the signal processor 14 is collected from a signal that is received by more than one base station 11, 11' of the network 10 and from signals that are received simultaneously at different frequencies by at least one base station 11, 11'. The collected sample vectors are delivered to the signal processor 14 over the communication links 15.

Each base station 11, 11' covers an area of terrain in the service area of the radio network 10. Network communications in the HF band permits extensive coverage overlap. The base stations 11, 11' share the received signals among each other as part of a receiver algorithm, which is enhanced by the coverage overlap by the base stations 11, 11'.

The signal processor 14 processes the collected sample vectors with the known information in the predetermined embedding pattern in order to detect a received signal that resulted from propagation of the transmitted signal from a remote station 12, 12' of the network.

Figure 2:
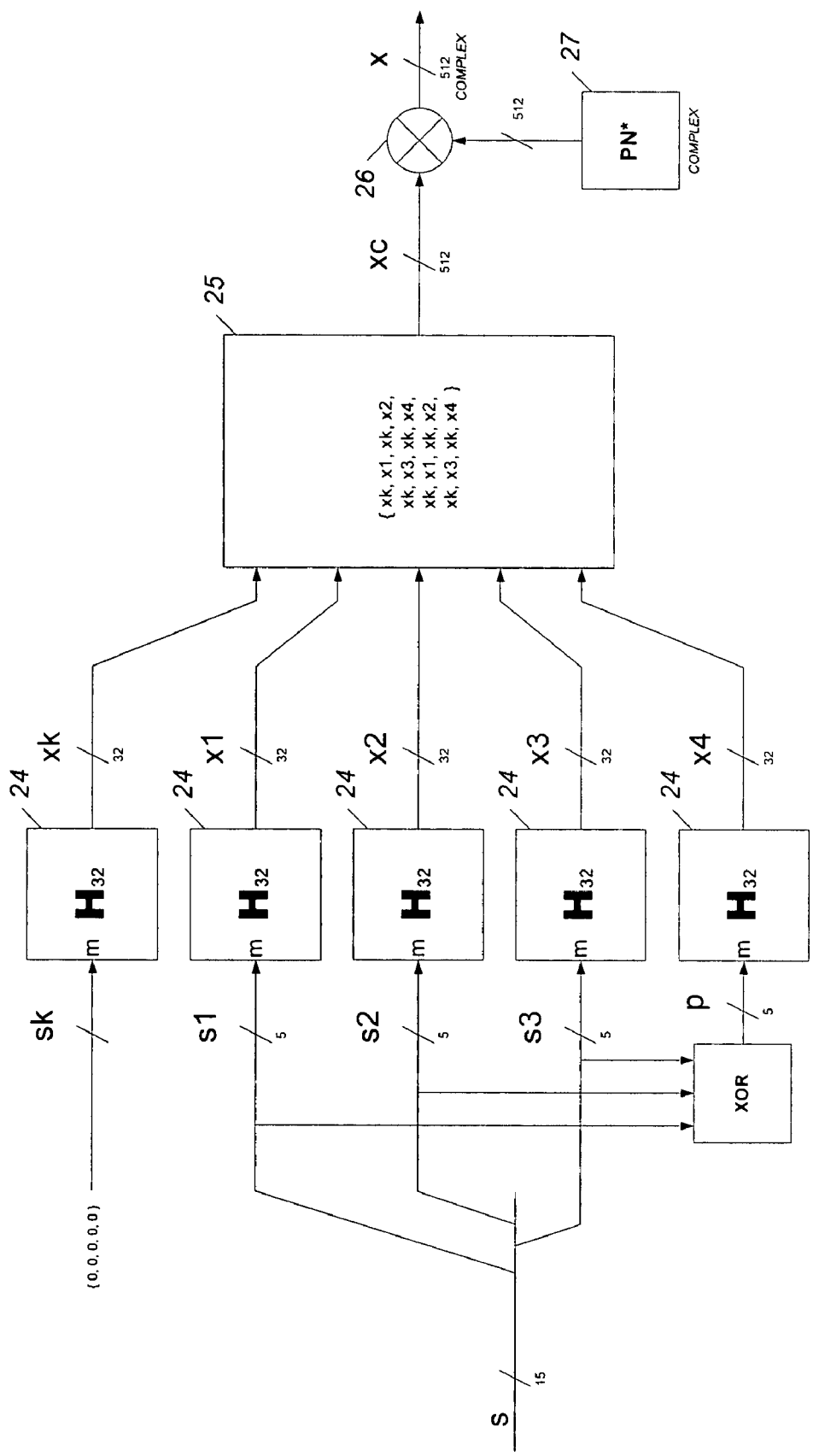
FIG. 2 is a diagram illustrating the modulation and encoding of a signal for transmission from a remote station of the radio network of FIG. 1 in accordance with an exemplary embodiment of the present invention.

An exemplary embodiment of a process used for modulating the signal is described with reference to FIG. 2.

The waveform of the signal includes repetitive sequences of symbols representing both "known" information (sk=0) and "unknown" information (the message itself). The unknown symbols are derived by partitioning each 15 bits of unknown information into three groups of 5 (s1, s2 and s3), and then adding a fourth 5-bit symbol, which is computed as the exclusive-or of the three 5-bit message symbols (p). Each symbol s and p is encoded as a row from a 32×32 element Hadamard matrix 24, which is defined below. This step ensures orthogonality of the symbols. The Hadamard matrix may be defined recursively as follows:

$H2=\{\{+1,+1\},\{+1,-1\}\}$ $H4=\{\{H2,H2\},\{H2-H2\}\}$

...

$H32=\{\{H16,H16\},\{H16,-H16\}\}$

The 5-bit symbols are thus mapped to 32-element sequences of value +/−1, as follows:

xk=H32[sk], x1=H32[s1], x2=H32[s2], x3=H32[s3], and x4=H32[p], where [ ] implies taking a row of the matrix.

These sequences are arranged into a longer composite sequence 25 containing two identical copies, a and b, of the four unknown information sequences, to with:

{xk, x1a, xk, x2a, xk, x3a, xk, x4a, xk, x1b, xk, x2b, xk, x3b, xk, x4b}

This results in a 16*32=512 symbol message XC. Note the predetermined pattern of distribution of known information xk in relation to the unknown information in the message XC.

In alternative embodiments, the signals are modulated by a process other than the process described above with reference to FIG. 2.

The known information is included in the modulation process for all different protocol waveforms that may be used in the uplink transmission, such as but not limited to ALE, ARQ and hybrid ARQ.

The amount of known information is such that the signal processor 14 can detect a transmission and estimate the channel at a significantly lower SNR (signal-to-noise ration) than the unknown data can be detected and estimated on a single transmission. By virtue of the presence and amount of known data, it becomes possible to efficiently combine signals received by arbitrarily separated base stations 11, 11'. At the limits of performance, it is not practically possible to detect desired signals without the known data.

The modulated message XC is encoded for transmission from the remote stations 12, 12' of the network by processing the modulated signal XC with a first feature. In the embodiment shown in FIG. 2, the 512-symbol modulated signal XC is multiplied (as shown as 26) with a 512-element pseudorandom complex sequence generated by a pseudorandom number (PN) generator 27. In a preferred embodiment, the generated complex sequence is:

$\mathrm{Exp}(2i\pi\rho_k), k=\{0,1,2,\ldots,511\}$ where Exp is the exponential function $e^x$, i is the imaginary number $\sqrt{-1}$, and $\rho_k$ are uniformly distributed random variables on [0,1].

The resulting symbols of the complex sequence encode the modulated message XC for PSK transmission of the signal.

Different pseudorandom complex sequences are used to encode modulated signals XC for transmission from the different remote stations 12, 12' of different networks 10. In alternative embodiments, different pseudorandom complex sequences are used to encode modulated signals XC for transmission from different groups of remote stations 12, 12' of a given network 10. The pseudorandom complex sequence may be changed from time to time, such as every eight hours or every day, for example.

In alternative embodiments some other sequence or some other feature is used to encode the modulated signal XC for transmission from the remote stations 12, 12' of the network 10.

Figure 3:
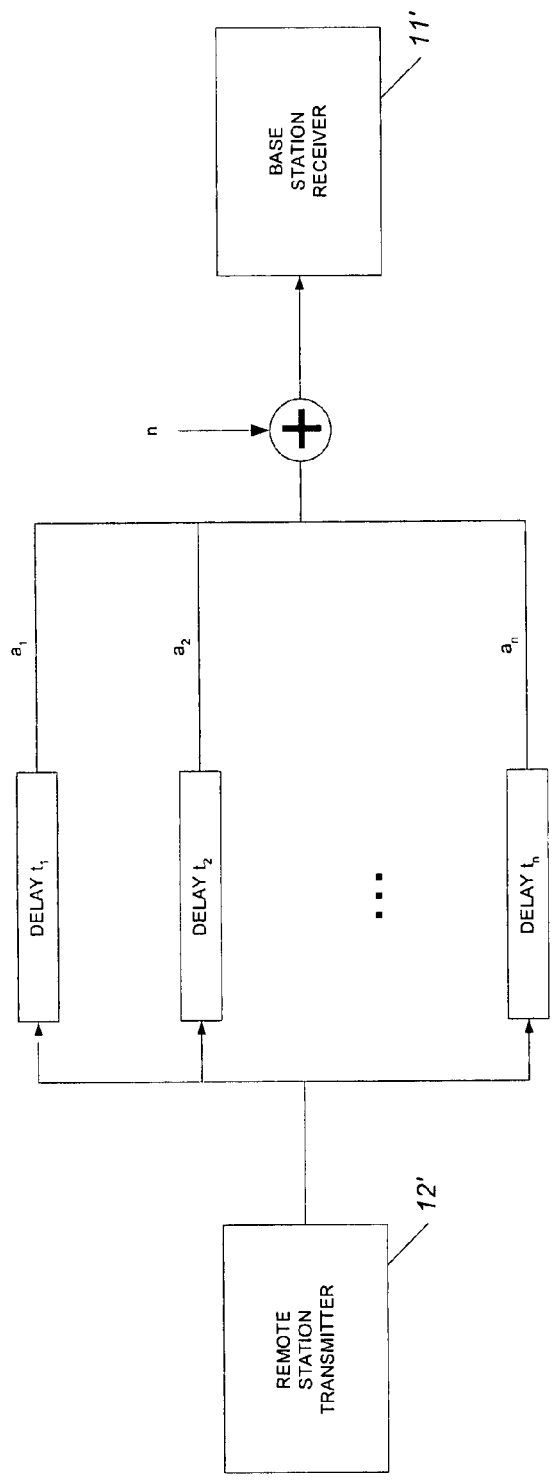
FIG. 3 is a simplified representation of a high frequency (HF) channel over which a transmitted signal is propagated from a particular remote station to a particular base station.

A simplified representation of a high frequency (HF) channel over which a transmitted signal is propagated from a particular remote station 12' to a particular base station 11' is shown in FIG. 3. The transmitted signal passes through a set of different paths $P_1, P_2, P_n$. These different paths both delay the signal by different durations $t_1, t_2, \ldots t_n$ and scale the signal by different factors $a_1, a_2, \ldots a_n$. In nature, these paths are a continuum of delay and scaling that depends on the particular reflective and absorptive obstacles encountered. Further, each path's parameters are time-varying. Finally noise n is added to the signal before arrival of the signal at one or more receiving base stations.

Figure 4:
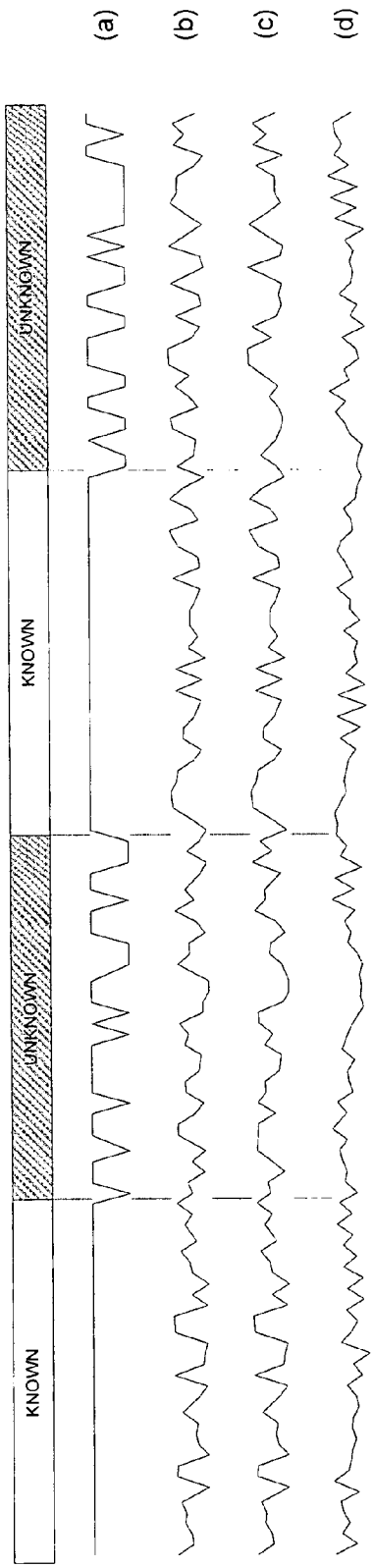
FIG. 4 illustrates the formation of a transmitted signal and an example of how the signal is affected by passing through the multi-path channel shown in FIG. 3.

FIG. 4 illustrates the formation of a transmitted signal and an example of how the signal is affected by passing through a multi-path channel such as is shown in FIG. 3. For clarity, the channel delays and scaling are held constant and no noise was added. At the top of the figure is a bar indicating the known and unknown information portions of a modulated signal. A plot of exemplary corresponding message symbols of the modulated signal is shown at (a). A plot of an exemplary PN sequence used to encode the modulated signal is shown at (b). A plot of the encoded signal as transmitted from the remote station 12' is shown at (c). A plot of an example of how the signal is affected by passing through the multi-path HF channel is shown at (d).

The base stations 11, 11' of the network that receive signals at the same time and/or at different frequencies collect and deliver a group of sample vectors of their respective received signals and other representative information to the signal processor 14 via the communication links 15. The signal collection process need not have available a complete record of each instance of a received signal. Rather, smaller portions of captured signals can be combined as available. The base stations 11, 11' can be dynamically allocated for the purpose of diversity and array reception. For example, a receiving base station may broadcast, "I am receiving on frequency f at time t", and any other base station that finds itself idle may then assist. These idle base stations may be allocated to the collection process to maximize performance.

The signal processor 14 analyzes the collected group of signals to detect signal presence and to estimate the channel response. The signal processor 14 first processes a sample vector of the signal that is received by the particular base station 11' at which the signal processor 14 is located, and then processes additional sample vectors that are delivered from the other the other base stations 11 of the network 10. Each processed sample vector adds a bias towards correct decoding of the received signals until there is sufficient weight to make a decision as to the detection of a received signal that resulted from propagation of the received signal from a remote station 12, 12' of the network.

Figure 5:
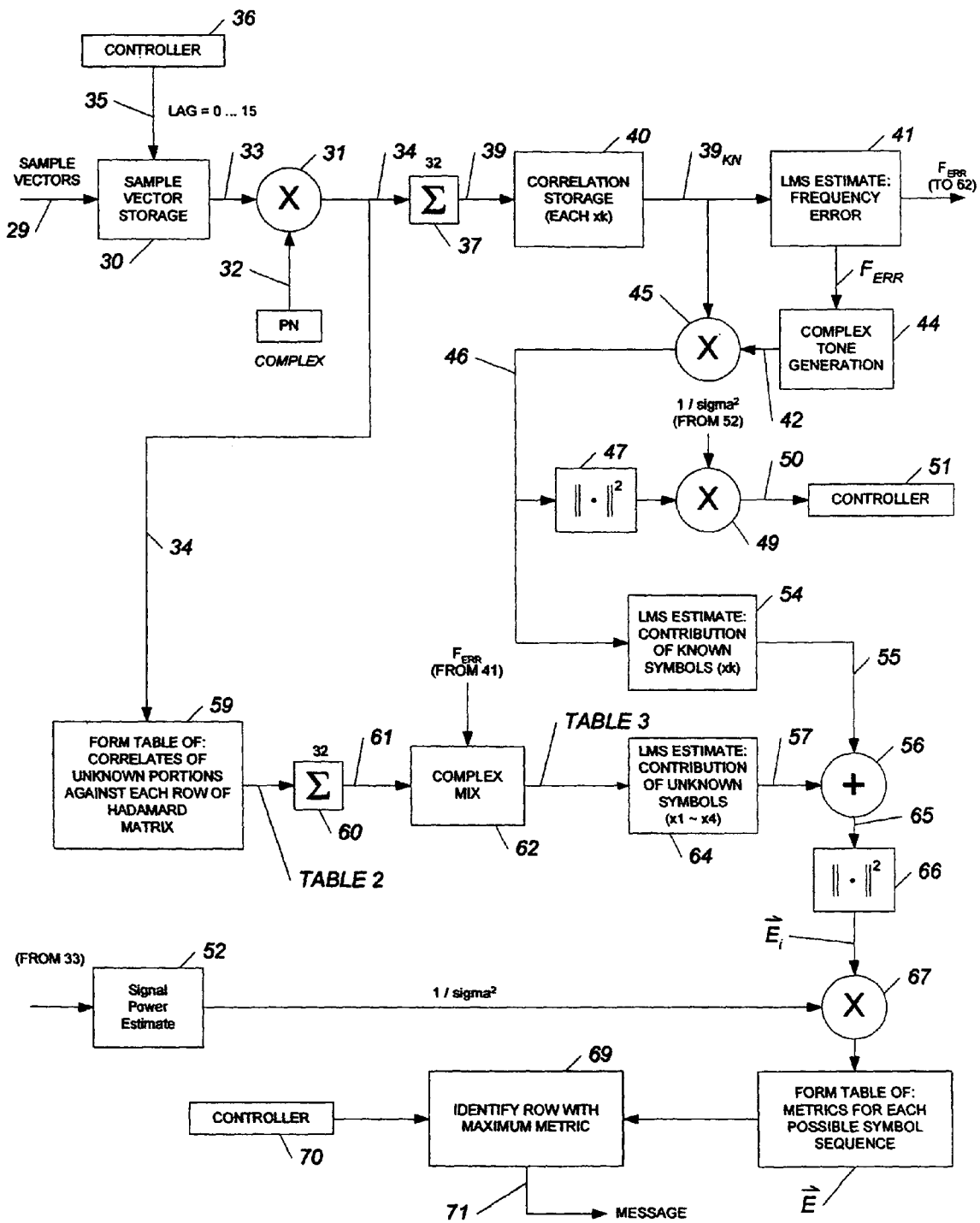
FIG. 5 is a diagram illustrating the processing of signals received at a base station in accordance with an exemplary embodiment of the present invention.

The processing by the signal processor 14 of an individual sample vector of a received signal is described with reference to FIG. 5. An individual sample vector 29 of the received signal is stored, as shown at 30. The stored sample vector is repeatedly processed by multiplication 31 of the stored sample vector 29 with a complex sequence 32 in order to provide a set of correlates 34 of the received signal. The complex sequence 32 is the conjugate of the pseudorandom complex sequence 27 that was used to encode modulated signals XC by the remote stations 12, 12' of the network 10. The repeated processing is accomplished by multiplying the stored sample vector with the complex sequence 32 at progressively increasing lag times. The durations of the lag times are determined by a signal 35 from a controller 36.

In effect, an ensemble of sample vectors 33 including time-lagged sample vectors and the original non-lagged sample 29 is provided for each of the collected sample vectors; and each of the lagged and non-lagged sample vectors is processed with the conjugate 32 of the complex PN sequence to provide the set of correlates 34 for each individual stored sample vector.

FIG. 6 shows the alignment of received signal with different lag times in relation to the beginning at time $t_0$ of the complex sequence 32 associated with the first known symbol block of the signal.

This repeated processing to provide a set 34 of correlates having different lag times enhances the detections of signals whose arrivals at different base stations 11, 11' are delayed by different durations.

When the base station 11, 11' of the network 10 is included in more than one network, the signal processor 14 is adapted for separately repeatedly processing the stored sample vector with conjugates of different pseudorandom complex sequences that are used respectively to encode modulated signals XC within the different networks to provide separate sets of correlates of the received signal in order to enable separate detection of signals from remote stations within the different network in which the base station 11, 11' is included.

Each 512-element correlate of the set of correlates 34 is divided into sixteen thirty-two-element blocks for further processing to estimate a frequency error present in the received signal;

Beginning with the first correlate of the set 34, the complex values of the thirty-two elements of each block are summed, as shown at 37 to provide a set of complex-value sums 39. The complex-value sums $39_{KN}$ for the blocks of the correlate that occupy positions in the correlate corresponding to the positions of the known information sequences xk in the modulated signal XC are stored in a memory 40. The eight positions in the correlate that correspond to the eight positions of the known information sequences xk in the modulated signal XC are in accordance with the predetermined embedding pattern used for modulating the signal, as described above with reference to FIG. 2.

During propagation from the remote station 12, 12' to the base station, 11, 11', the received signal has passed through a channel that can produce severe, time-varying distortion resulting from a frequency error in the received signal and channel error effects. Therefore, each correlate is processed by the signal processor 14 to estimate the frequency error and to correct the correlate in accordance with the estimated frequency error. The process of estimating the frequency error takes into account the channel error effects.

The sequence of complex-value sums $39_{KN}$ stored in the memory 40 are processed, as shown at 41, to estimate a frequency error $F_{ERR}$ present in the received signal that is represented by the particular correlate of the set that is being processed. This processing 41 is based upon minimization of a mean-square error between the received sample vector of the signal and an estimate of the transmitted signal, with respect to both frequency error and channel error effects. Minimization of mean-square-error is known as "the method of least squares" or Least Mean Squares (LMS). To accomplish minimization, the signal processor 14 enumerates an estimation routine over a set of discrete frequency errors that cover the planned range of error tolerance. This estimation routine is based upon consideration of several factors.

When a signal is sampled, measurements of the value of the signal are made at regular, discrete points in time. Reconstruction of the signal from the sampled values imposes certain constraints on that signal. In particular, the signal bandwidth must be less than or equal to half of the sampling rate. For example, a 1 kHz sampling rate implies a signal bandwidth less than or equal to 500 Hz. In the case of complex sampled values, each complex value acts effectively as two sample values, whereby the signal bandwidth may be equal to the sample rate. There are practical limitations that prevent use of the full bandwidth.

Reconstruction of the sampled signal makes use of the Sinc function, which is defined as:

$$\text{Sin}(\pi x)/(\pi x) \text{ for } x \neq 0 \quad \text{[Definition 1]}$$
$$1 \quad x = 0$$

In FIG. 7, the Sinc function is plotted for the x values from −2 to 2. To obtain the original band-limited signal, exemplified in FIG. 8A, a scaled and shifted copy of the Sinc function, as shown in FIG. 7, is superimposed over a sequence of sample values, as shown in FIG. 8B. The sum of the superimposed signals results in a reconstruction of the original signal.

Figure 9A:
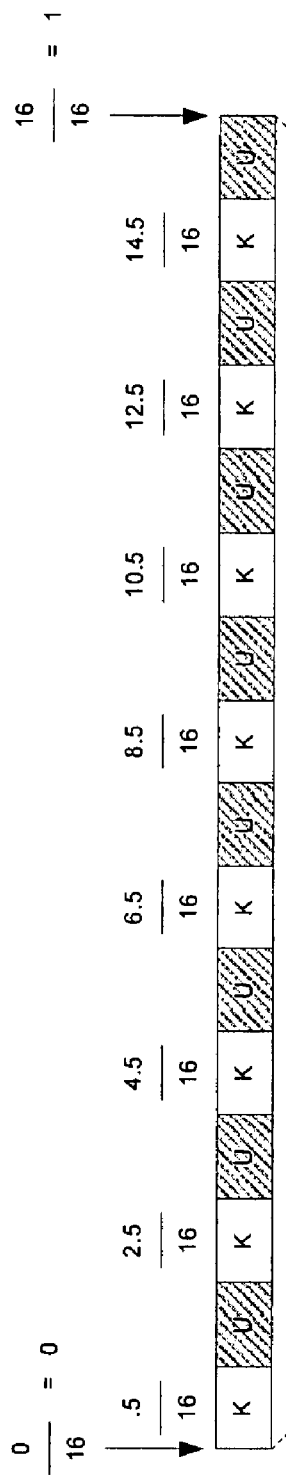
FIG. 9A illustrates the sampling of known and unknown information in a signal modulated in accordance with a preferred embodiment of the present invention.

In a preferred embodiment, measured values of the signal are taken at a rate of 2400 measurements/second, whereby the sequence of complex-value sums $39_{KN}$ are provided from the memory for estimation of the frequency error at a sampling rate of 2400 Hz/32/2=37.5 Hz. Other embodiments may use a different measurement rate and/or a different sampling rate. A rate of 37.5 Hz represents oversampling of the channel at eight times the Nyquist rate in relation to the recurrence of the known data, as shown in FIG. 9A, wherein the ratios of sampling times in relation to the length of the correlate are shown above each known block. These ratios define the assigned phase and position of the channel measurements in relation to notional sampling times, which are shown at the extreme ends of the known/unknown pattern (positions 0/16 and 16/16). The ratios are therefore normalized such that a ratio of 1.0 is equal to one notional measurement time. The "Nyquist rate" refers to sampling at a relevant critical rate according to the signal bandwidth.

Figure 9B:
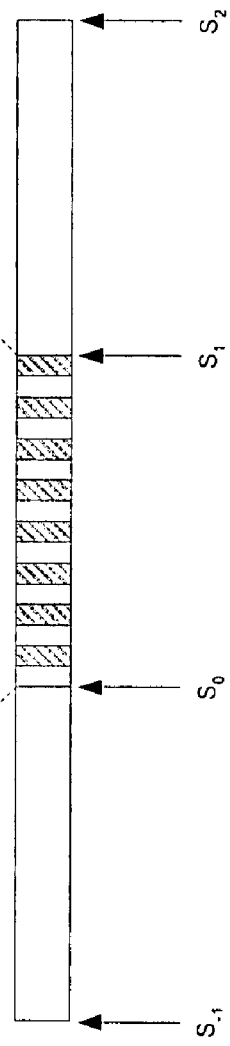
FIG. 9B shows the defined position of notional channel sampled values in relation to the pattern of known and unknown information in the signal shown in FIG. 9A FIGS. 10A through the 10E disclose an exemplary embodiment of source code utilized for processing of signals received at a base station, as described with reference to FIG. 5.

In FIG. 9B, the defined position of notional channel sample values are shown at the Nyquist rate $\{S_{-1}, S_0, S_1, S_2\}$, in relation to the pattern of known/unknown information in the signal, whereby notional sampling rate is 4.6875 Hz, which represents the bandwidth of the channel variability tolerated by the receive algorithm.

The concept of notional channel sampled values is utilized in estimating the frequency error. In order to jointly estimate the frequency error $F_{ERR}$ and the channel response, start with the following equation:

$$Dy=Ax \quad \text{[Eq. 1]}$$

where D is a diagonal matrix of sample vectors of a complex sinusoid representing different frequency error values, y is a vector of complex value sums $39_{KN}$ over the known values, A is a set of basis functions, and x is a vector representing a best estimate of the channel error effect.

The idea is to find values for D and x that most closely solve Equation 1.

Because y represents a noisy sequence, there is no exact solution to Equation 1 in general. Therefore, an estimate of the frequency error is required. This estimate is provided by the following expression:

$$\text{Min}z_{D,x}\|Dy-Ax\|^2 \quad \text{[Expression 1]}$$

Expression 1 is solved for D and x by testing a small set of discrete frequency error values D by enumeration, and then picking the frequency error value that results in the minimum value of Expression 1 after solving for x. Each iteration for a different discrete frequency error value D is referred to as a "trial".

The variables in Expression 1 are provided as follows:

$$D_{n,n}=\text{Exp}(j2\pi k2(n-1)2.5/75) \quad \text{[Eq. 2]}$$

where k=−1, 0 or 1 and $$n=\{1,2,3,\ldots,8\},0 \text{ otherwise.} \quad \text{[Eq. 3]}$$

A matrix D is formed by setting k for a particular trial, then computing $D_{n,n}$ for each n.

$$y=\{y_0,y_1,y_2,\ldots,y_{K-1}\} \quad \text{[Eq. 4]}$$

y is the vector of the sequence of complex values $39_{KN}$ of length K.

The columns of the matrix A are computed according to basis functions centered at the notional sampling times of $\{S_{-1}, S_0, S_1, S_2\}$, according to the phase and spacing indicated in FIG. 9A. The basis functions f(x) are defined as:

$$\text{Sinc}(x)Hamming(x/4+1/2) \text{ for } x=[-2,2] \quad \text{[Definition 2]}$$
$$0 \quad \text{otherwise}$$

Where Hamming(x) is $$0.54-0.46\text{Cos}(2\pi x) \text{ for } x=[0,1] \quad \text{[Definition 3]}$$
$$0 \quad \text{otherwise}$$

From linear algebra, when A is full-rank, a least-squares estimate of x can be calculated by using the following formula:

$$\underline{x}=(A^*A)^{-1}A^*Dy \quad \text{[Eq. 5]}$$

where the underbar denotes the LMS optimal solution for x. The quantity for minimization (Expression 1) can be rewritten as:

$$(Dy-Ax)^*(Dy-Ax) \quad \text{[Expression 2]}$$

where the superscript "*" is the conjugate transpose of a matrix. The inverse of a matrix is denoted with a superscript "−1".

Because D is unitary, and because (A$\underline{x}$) is perpendicular to (D y−A x), one can substitute $\underline{x}$ for x in Expression 2 and obtain $$\|Dy\|^2-y^*D^*A(A^*A)^{-1}A^*Dy \quad \text{[Expression 3]}$$

Notice that x no longer appears but is now implicit in the calculation. Now, the first term in Expression 3 is a constant (the square of the magnitude of the sequence of complex values $39_{KN}$), whereby one need only maximize the second term in order to minimize the whole because D is unitary. The only free variable left is D. For computational efficiency, a few more steps are taken to simplify the other constants in the expression.

Let $W^*W=(A^*A)^{-1}$, where W is determined by Cholesky decomposition of the term $(A^*A)^*$ Then the second term in Expression 3 becomes:

$$\|WA^*Dy\|^2 \qquad \text{[Expression 4]}$$

By letting $U=W A^*$, the second term in Expression 3 becomes:

$$\|UDy\|^2 \qquad \text{[Expression 5]}$$

Expression 5 can be maximized by trying different values for D.

As an initialization step, the receiver pre-computes values for U and D for Expression 5. Then, whenever a sequence of complex-value sums $39_{KN}$ becomes available for the vector y, the value V of Expression 5 is computed by using different values of k to compute the value D in accordance with Equation 2.

TABLE 1

| k | Expression 5 |
|---|---|
| −1 | $V_{-1}$ |
| 0 | $V_0$ |
| 1 | $V_1$ |

Referring to Table 1, the value of k that produces a value of D that results the maximum value V in the second column of the table indicates the best estimate of the frequency error in the received signal. This value of k is used to compute the estimated frequency error $F_{ERR}$ for further processing of the correlates.

A complex tone 42 having value that is the negative of the estimated frequency error $F_{ERR}$ is generated, as shown at 44, by processing the value of estimated frequency error $F_{ERR}$ in accordance with the expression:

$$\text{Exp}(j2\pi k2(n-1)2.5/75) \qquad \text{[Expression 6]}$$

The sequence of complex-value sums $39_{KN}$ for each correlate of the set 34 is corrected by multiplying the sequence of complex-value sums $39_{KN}$ by the complex tone 42, as shown at 45, to thereby provide a corrected known information sequence 46.

The squared modulus of the value of the corrected known information sequence 46 is computed, as shown at 47, and scaled by multiplication with a reciprocal $1/\text{sigma}^2$ derived from an estimate of the power of the received signal, as shown at 49, to provide a value 50 that is compared with a threshold value by a controller 51 to determine whether or not the particular lagged, or non-lagged sample of the received signal represented by the corrected known information sequence 46 being processed is of sufficient strength to estimate that the particular corrected known information sequence 46 resulted from propagation from a remote station 12, 12' of the network 10 of a signal that was modulated for transmission by embedding the known information throughout the signal in the predetermined pattern.

A received signal that resulted from said propagation is detected upon the controller 51 estimating that the particular corrected known information sequence 46 resulted from propagation of such a modulated signal from a remote station 12, 12' of the network 10. Such an estimation warrants and thereupon enables (a) further processing of the particular corrected known information sequence 46 and (b) processing of the blocks to of a correlate that occupy positions in the correlate corresponding to the positions of the unknown information (x1a, x2a, x3a, x4a, x1b, x2b, x3, b, x4b) in the modulated signal XC.

The reciprocal $1/\text{sigma}^2$ of the estimated power of the received signal is provided, as shown at 52, by processing the particular lagged or non-lagged signal-burst complex sample vector that is provided from the sample vector storage memory 30 for multiplication by the second sequence 32. The estimated signal power is the sum of the square modulus of each complex sample vector, divided by the number of sampled values.

The corrected known information sequence 46 for the particular correlate is processed, as shown at 54 to provide a least means square (LMS) indication 55 of the residual error between the received signal and the known information for the portions of the particular correlate containing the known information in a sample vector; and the blocks of the correlate that occupy positions in the correlate corresponding to the positions of the unknown information sequences x1, x2, x3, x4 in the modulated signal XC are processed to provide a set 57 of LMS indications of residual errors between the received signal and different possible combinations of unknown information for the portions of the particular correlate containing the unknown information in a sample vector. The residual error is the difference between first and second terms in Expression 3. The indications 55 and 57 of the residual error are estimates of the respective value of the second term of Expression 3, whereby a larger estimate indicates a smaller residual error.

Computational efficiency is gained by not performing such processing until it is warranted as determined by the thresholding process in controller 51.

The processing 54 of the corrected known information sequence 46 for the particular correlate to provide the LMS indication 55 is based upon some of the concepts that formed the basis for estimating the frequency error, as described above. The processing 54 also is based upon Expression 3 above and below, except that the channel estimation process accounts for both the known information and the unknown information instead of only the known information sequences xk, which were used above for estimation of the frequency error.

$$\|Dy\|^2 - y^*D^*A(A^*A)^{-1}A^*Dy \qquad \text{[Expression 3]}$$

In this case, since D has already been determined and accounted for, it is dropped to provide:

$$\|y\|^2 - y^*A(A^*A)^{-1}A^*y \qquad \text{[Expression 7]}$$

Matrix A has more entries than in the frequency error estimation process described above, since the y vector includes the entire set of complex-value sums 39 for both the known information and the unknown information. Nonetheless Matrix A is still evaluated for the same notional sampling times and for the same basis function, but at more points. See FIGS. 9A and 9B and Definitions 2 and 3 above.

$$A=[\text{basis}(16.5-16(n-1)+(m-1))], m=1,2,\ldots,16, \\ n=1,2,3,4 \qquad \text{[Eq. 6]}$$

Let $W^*W=(A^*A)^{-1}$, where W is determined by Cholesky decomposition of the term $(A^*A)^{-1}$. Then Expression 7 becomes:

$$\|y\|^2 - \|WA^*y\|^2 \qquad \text{[Expression 8]}$$

Finally, by letting U=W A*, $$\|y\|^2 - \|Uy\|^2 \qquad \text{[Expression 9]}$$

In the preferred embodiment, only the second term of Expression 9 is evaluated. This has been shown by experiment to produce good results. However, additional performance may be gained by utilizing the entire expression.

Taking a closer look at Expression 9, the second expression is the magnitude squared of the product of two matrices, U y.

$$\begin{bmatrix} u_{1,1} & u_{1,2} & u_{1,3} & \cdots & u_{1,16} \\ u_{2,1} & u_{2,2} & & & u_{2,16} \\ \cdots & & & & \cdots \\ u_{4,1} & \cdots & & & u_{4,16} \end{bmatrix} \begin{bmatrix} y_1 \\ y_2 \\ \cdots \\ y_{16} \end{bmatrix}$$

The vector y containing only the odd-indexed elements 1, 3, . . . , 15 is filled with the correlation sums (complex-value sums $39_{KN}$) for the blocks of known information, and the vector y containing only the even-indexed elements 2, 4, . . . , 16 is filled with the correlation sums (complex-value sums $39_{uKN}$) for the blocks of unknown information. Observing the rule for matrix multiplication, one can break Expression 7 into the sum of two separate matrix multiplications:

$$U2K \cdot \overrightarrow{CKT} + U2U \cdot \overrightarrow{CUTM} \qquad \text{[Expression 10]}$$

Where $$U2K = \begin{bmatrix} u_{1,1} & u_{1,3} & u_{1,5} & \cdots & u_{1,15} \\ u_{2,1} & u_{2,3} & & & u_{2,15} \\ \cdots & & & & \cdots \\ u_{4,1} & \cdots & & & u_{4,15} \end{bmatrix} \qquad \text{[Eq. 7]}$$

$$U2U = \begin{bmatrix} u_{1,2} & u_{1,4} & u_{1,6} & \cdots & u_{1,16} \\ u_{2,2} & u_{2,4} & & & u_{2,16} \\ \cdots & & & & \cdots \\ u_{4,2} & \cdots & & & u_{4,16} \end{bmatrix} \qquad \text{[Eq. 8]}$$

$$\overrightarrow{CKT} = \begin{bmatrix} y_1 \\ y_3 \\ y_5 \\ \cdots \\ y_{15} \end{bmatrix} \qquad \text{[Eq. 9]}$$

$$\overrightarrow{CUTM} = \begin{bmatrix} y_2 \\ y_4 \\ y_6 \\ \cdots \\ y_{16} \end{bmatrix} \qquad \text{[Eq. 10]}$$

The LMS indication 55 for the blocks of known information is provided by computing:

$$\overrightarrow{E_K} = U2K \cdot \overrightarrow{CKT} \qquad \text{[Eq. 11]}$$

The signal processor 14 is prepared to receive a signal by creating an all-zeros table (called E) with $32^3$ entries, and the matrices U2K and U2U are pre-computed for each lagged and non-lagged sample vector of the received signal. $\overrightarrow{E_K}$ is computed for each such sample vector only when the controller 51 determines that the particular lagged, or non-lagged sample vector is of sufficient strength to warrant further processing of the particular corrected known information sequence 46.

The processing of the blocks of the correlate that occupy positions in the correlate corresponding to the positions of the unknown information (x1a, x2a, x3a, x4a, x1b, x2b, x3, b, x4b) in the modulated signal XC is now described.

Beginning with the first correlate of the set 34, the complex values of the thirty-two elements of each block that occupy positions in the correlate corresponding to the positions of the unknown information are processed, as shown at 59, to form a table (Table 2) with 8 rows and 32 columns. The rows of Table 2 correspond to the correlates for x1a, x2a, x3b, x4b. The columns of the table correspond to the rows of the Hadamard matrix. A summary of Table 2 is shown below:

TABLE 2

|  | H32 row 1 | H32 row 2 | H32 row 3 | . . . | H32 row 32 |
| --- | --- | --- | --- | --- | --- |
| x1a | $V_{1,1}$ | $V_{1,2}$ | $V_{1,3}$ |  | $V_{1,32}$ |
| x2a | $V_{2,1}$ | $V_{2,2}$ | $V_{2,3}$ |  | $V_{2,32}$ |
| x3a | $V_{3,1}$ | $V_{3,2}$ | $V_{3,3}$ |  | $V_{3,32}$ |
| x4a | $V_{4,1}$ | $V_{4,2}$ | $V_{4,3}$ |  | $V_{4,32}$ |
| x1b | $V_{5,1}$ | $V_{5,2}$ | $V_{5,3}$ |  | $V_{5,32}$ |
| x2b | $V_{6,1}$ | $V_{6,2}$ | $V_{6,3}$ |  | $V_{6,32}$ |
| x3b | $V_{7,1}$ | $V_{7,2}$ | $V_{7,3}$ |  | $V_{7,32}$ |
| x4b | $V_{8,1}$ | $V_{8,2}$ | $V_{8,3}$ |  | $V_{8,32}$ |

As shown at 60, each entry $V_{R,C}$ of the table is computed as a correlation sum 61 of the correlates from an x row and a H32 row column. For example, value $V_{6,3}$ is computed as:

$$V_{6,3} = \sum_{i=1}^{32} x2b_i \cdot H32_{3,i} \qquad \text{[Eq. 12]}$$

The processing at 60 results in a number of correlation sum sequences 61 equal to the product of the number of sample vectors and the number of Hadamard sequences.

The correlation sum sequences 61 for the unknown information are corrected, as shown at 62, for the frequency error $F_{ERR}$ estimated at 41 by mixing a sequence of the correlation sum sequences with a complex tone:

$$\text{Exp}(j2\pi k(2(m-1)+1)2.5/75), \, m=\{1,2,\ldots,8\} \qquad \text{[Expression 11]}$$

where k is the estimated frequency error $F_{ERR}$, and m is the row number of Table 2.

The corrected correlation sum sequences 61 for the unknown information are entered into a table (Table 3), in which the rows correspond to the unknown symbols and the columns correspond to rows of the Hadamard matrix.

TABLE 3

| y | Row | Column |
| --- | --- | --- |
| y2 | x1a | m1 |
| y4 | x2a | m2 |
| y6 | x3a | m3 |
| y8 | x4a | m1 XOR m2 XOR m3 |
| y10 | x1b | m1 |
| y12 | x2b | m2 |
| y14 | x3b | m3 |
| y16 | x4b | m1 XOR m2 XOR m3 |

At 64, the LMS indication 57 for sequence of correlation sequences 61 for the unknown information is provided by computing:

$$\overrightarrow{E_U} = U2U \cdot \overrightarrow{CUTM} \qquad \text{[Eq. 13]}$$

See Equations 8 and 10 for the terms of the right side of Equation 13.

The processing 64 is based upon the same concepts as the processing 54 discussed above. The processing at 64 occurs for enumerations of all possible messages (32^3). Candidate symbols x1, x2 and x3 are iterated over, while x4 is taken as the XOR of x1~x3 as shown in FIG. 2). The effect of symbol x4 and its repeated value is to increase the distance between each codeword (encoded message) consisting of x1 through x4. This particular choice of an XOR operation to derive a codeword is not required. Other encoding schemes can be chosen for alternative embodiments.

The LMS indication 55 for the known information in the signal is added at 56 to the LMS indication 57 for the unknown information in the signal to compensate for the channel error effects in the LMS indication 57, to thereby provide an indication 65 of the relative value of one hypothesized message.

The squared modulus of the value of indication 65 is computed, as shown at 66, and the squared modulus is scaled, as shown at 67, by multiplication with the reciprocal 1/sigma$^2$ derived from an estimate of the power of the received signal to provide an indication $\vec{E}_i$ of the residual error of the particular sample vector being processed. The indication $\vec{E}_i$ is accumulated in a table E as all of the correlates of all of the lagged and non-lagged sample vectors provided from all of the sample vectors collected from the signal are processed. The indication $\vec{E}_i$ computed according to:

$$\vec{E}_i = \vec{E}_i + \frac{1}{\sigma_{estimate}} \|\vec{E}_K + \vec{E}_U\|^2 \quad [\text{Eq. 14}]$$

Where the index i is computed as follows:

$$i = m1 + 32m2 + 32^2 m3$$

Let variables m1, m2 and m3 each take on a value in the range (0, 31). These represent the message as a series of 5-bit symbols. Computations are made for each possible combination of values for m1, m2 and m3. See Table 3.

Finally, at 69 a controller 70 processes the accumulated indications in the table E to identify the indication $\vec{E}_i$ in the table E having the maximum magnitude as the best estimate of the complete 15-bit message in the received signal. The corrected unknown information sequence of the particular correlate that is associated by the index i with the identified indication $\vec{E}_i$ having the maximum value is selected for providing the 15-bit unknown information message 71 contained in the received signal.

Figure 10A:
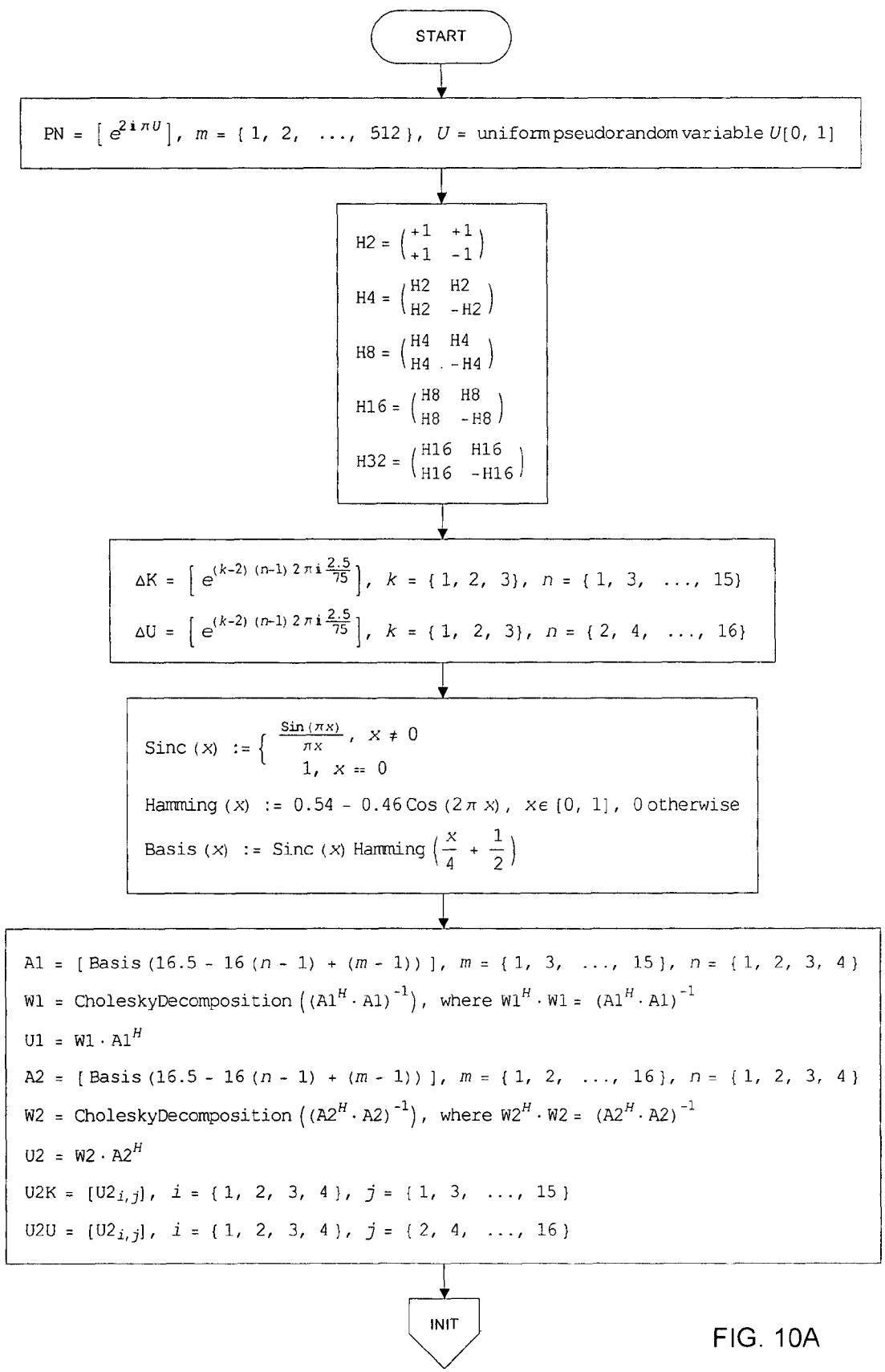

FIGS. 10A through the 10E disclose an exemplary embodiment of source code utilized by the signal processor 14 for performing various functions described above with reference to FIG. 5.

Figure 10B:
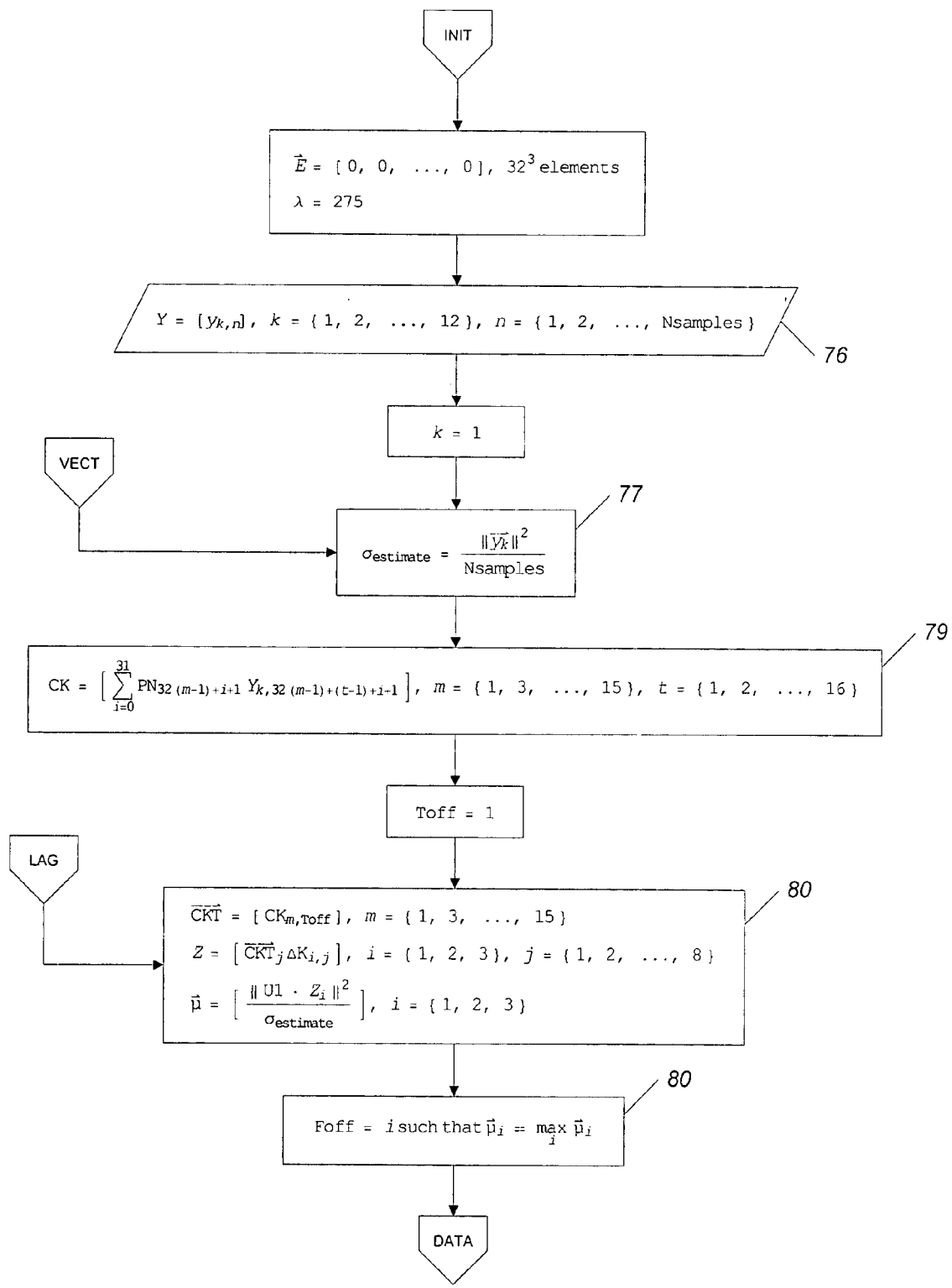

Referring to FIG. 10B, the block 76 is utilized during sample vector storage 30; the block 77 is utilized during the signal power estimate 52; the block 79 is utilized during the multiplication function 31, the summation function 37 and the storage function 40; the block 80 is utilized during the estimation of the frequency error at 41, the squared modulus function 47 and the multiply 49.

Figure 10C:
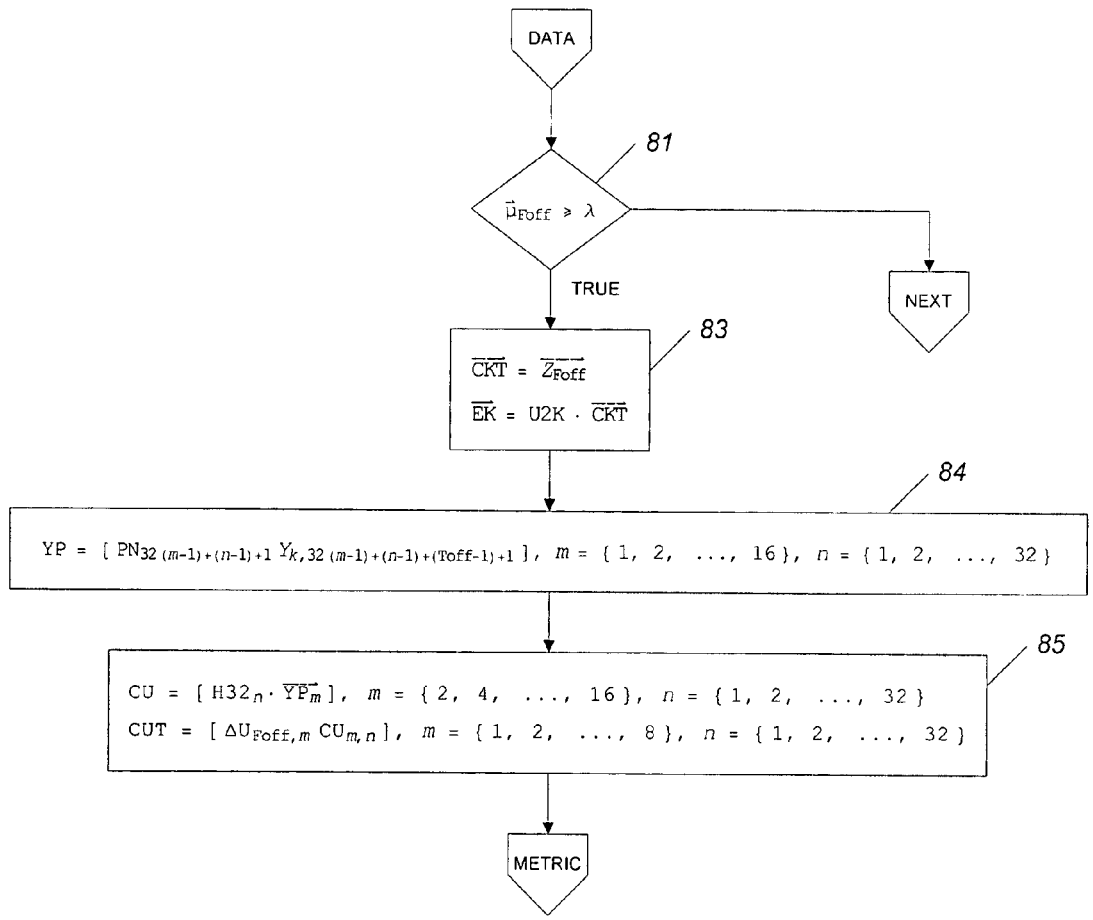

Referring to FIG. 10C, the block 81 is used by the controller 51; the block 83 is utilized during the least-squares estimate 54, the block 84 is utilized for providing correlates of the samples corresponding to the unknown data; the first line of the block 85 is utilized during table formation function 59 and during the summation function 60; and the second line of the block 85 is utilized during the complex mix function 62.

Figure 10D:
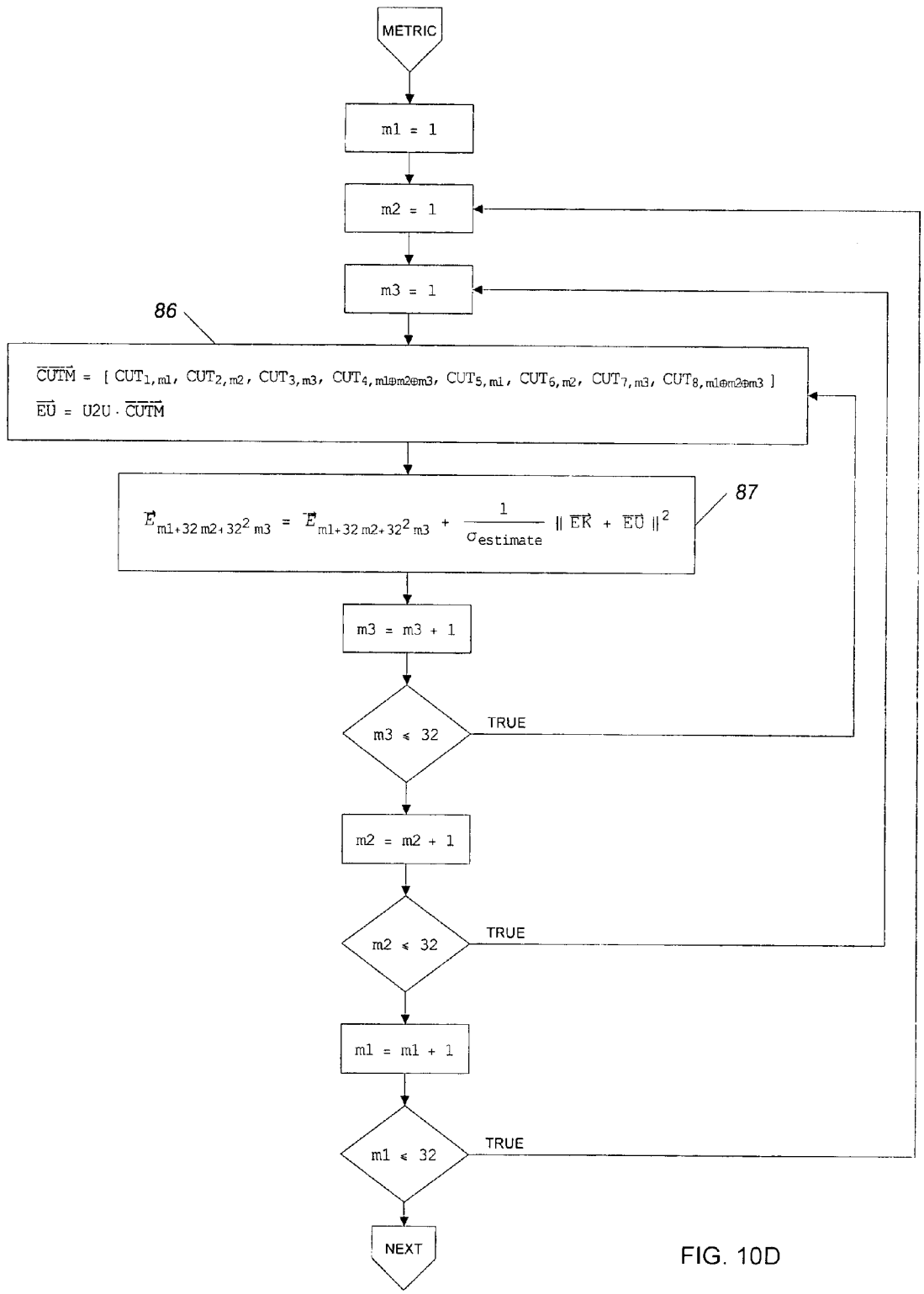

Referring to FIG. 10D, the block 86 is utilized during the least-squares estimate 64; and the block 87 is utilized during the summation function 56, the squared modulus function 66, the multiplication function 67 and the accumulation of metrics in the table E.

Figure 10E:
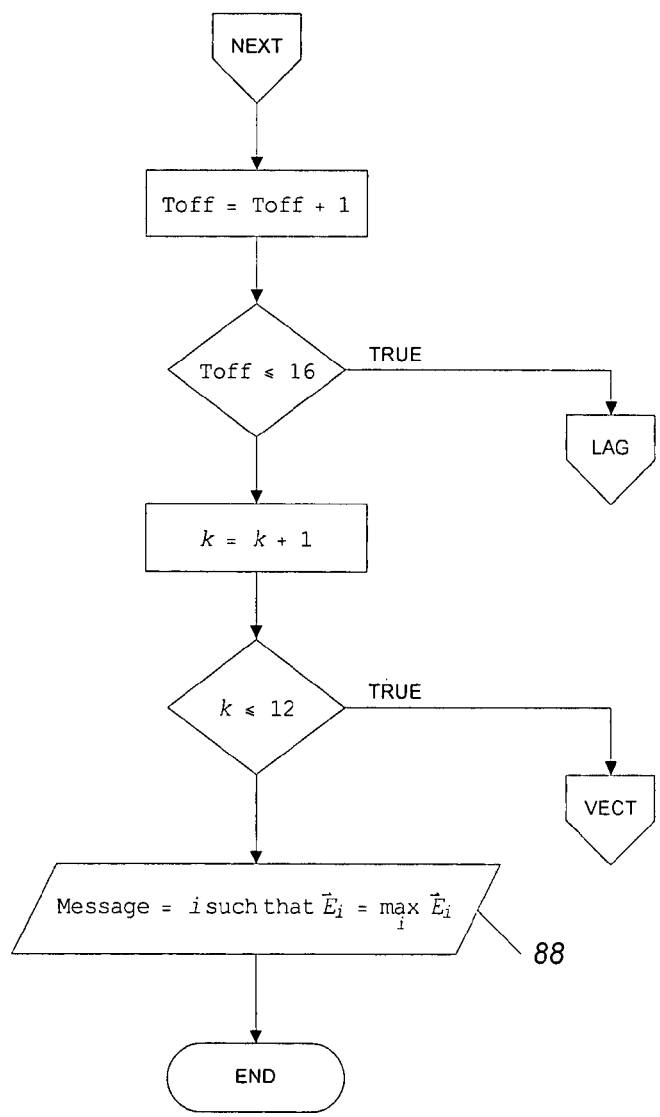

Referring to FIG. 10E, the block 88 is utilized during the row identification function 69.

Figure 11:
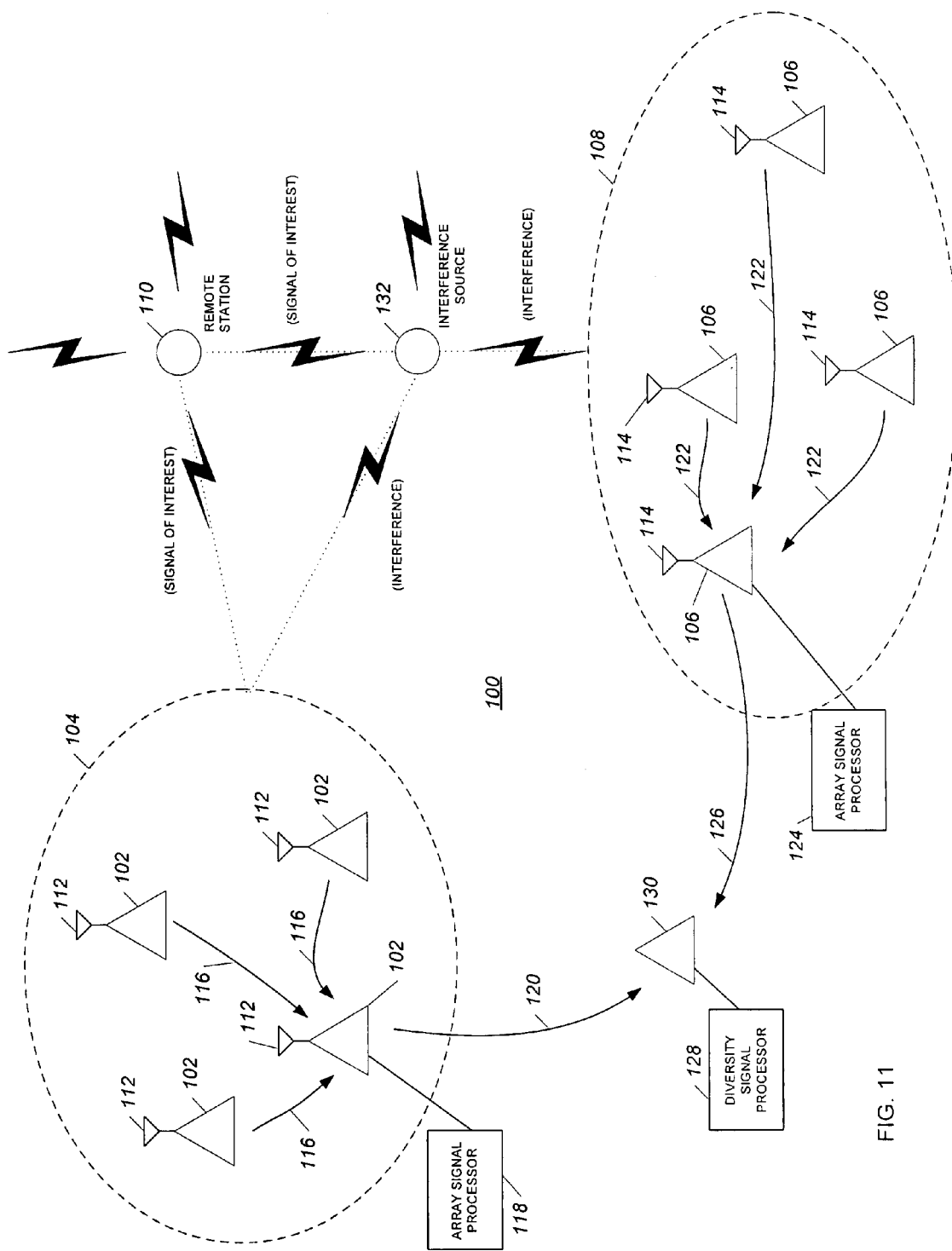
FIG. 11 is a diagram of an alternative embodiment of a radio network in which communications are conducted in accordance with the present invention.

Referring to FIG. 11, in an alternative embodiment, a radio network 100 includes a first plurality of spatially separated base stations 102 that are located in a first common region 104 and second plurality of spatially separated base stations 106 that are located in a second common region 108. The second common region 108 is disposed at a different bearing than the first region 104 with respect to a particular remote station 110 from which a modulated and encoded signal is transmitted. The network 100 also includes additional remote stations (not shown). The transmitted signal is modulated and encoded for transmission from the remote station 110 in the manner described above with reference to FIG. 2.

A first array of antennas 112 are respectively disposed at the base stations 102 which are located in the first common region 104; and a second array of antennas 114 are respectively disposed at the base stations 106 which are located in the second common region 108. The antennas 112, 114 of each array are separated spatially by some minimum distance, but the antennas of each array are constrained to exist within a respective common region 104, 108 having a maximum area. The maximum area is such that the channel characteristics from the intended signal source to each receiver are strongly correlated. The area is roughly expected to have a maximum diameter of 10 km for receiving signals from distant signal sources. The minimum distance is desired to be such that the receiver at each base station 1-2, 106 experiences independent local noise.

The receivers for each array of antennas 112, 114 are programmed to sample arriving signals relatively simultaneously such that each captured sample of a set of sample vectors is taken within a very small time window. Further, the step of providing a set of sample vectors of the received signal begins and ends at the same time at the receivers of all of the base stations 102, 106. Finally, the relative frequency error between the base station 102, 106 and the intended source of the received signal (a particular remote station 110) is compensated for by the source. The amount of frequency error correction is determined through measurement of one or more downlink transmissions. These details are prerequisites of the invention, but they are not addressed directly as their implementation is part of the prior art.

Since the sample vectors of the signal received by the different antennas 112, 114 are provided by the receivers of the different base stations 102, 106 at nearly the same instant, each set of sample vectors will have a different carrier phase in relation to the others. It is possible to weight each set of sample vectors so that the carrier phases are equal.

A first group of sample vectors 116 is obtained by the base stations 102 located in the first common region 104 by sampling a signal that is received simultaneously by the first array of antennas 112. The first group of sample vectors 116 is collected and provided to a first signal processor 118, which is coupled to one of the base stations 102 located in the first common region 104. The first signal processor 118 processes the first group of sample vectors 116 to provide a first resultant sample vector 120.

A second group of sample vectors 122 is obtained by the base stations 106 located in the second common region 108 by sampling a signal that is received simultaneously by both the second array of antennas 114 and the first array of antennas 112. The second group of sample vectors 122 are collected and provided to a second signal processor 124, which is coupled to one of the base stations 106 located in the second common region 104. The second signal processor 124 processes the second group of sample vectors 122 to provide a second resultant sample vector 126. Each resultant sample vector 120, 126 provides a joint optimization of the signal weights and an estimate of the channel time-varying impulse response in order to minimize a mean square error metric.

Since each resultant sample vector 120, 126 may be regarded as an output sample vector from a single receiver, each sample vector 120, 126 may be applied as a front-end to processors of existing standard waveforms that include the required known signal (the X matrix). Examples of this would include the HF military standards Mil-Std-188-110B and Mil-Std-188-141B. Essentially, the array processing is transparent and may be used to augment the performance of existing waveforms not specifically designed for use with antenna arrays.

The first resultant sample vector 120 and the second resultant sample vector 126 are collected and provided to a diversity signal processor 128 which processes the first and second resultant sample vectors 120, 126 with the known information in the predetermined embedding pattern in order to detect a received signal that resulted from propagation of the transmitted signal from the particular remote station 110. The diversity signal processor 128 processes the collected resultant sample vectors 120, 126 with the known information in the predetermined embedding pattern in order to detect a received signal that resulted from propagation of the transmitted signal.

The diversity signal processor 128 processes the resultant sample vectors 120, 126 in the same manner as the signal processor 14 processes the sample vectors 29 provided thereto in the embodiment described above with reference to FIG. 5. Although the diversity signal processor 128 is shown as being coupled to a base station 130 that is not located in either the first common region 104 or the second common region 108, in an alternative embodiment, the diversity signal processor 128 can be coupled to a base station 130 that is located in either the first common region 104 or the second common region 108.

During the processing of the first and second groups of sample vectors 116, 122 by the respective first and second array signal processors 118, 124, each individual sample vector 116, 122 is separately processed with the known information in the signal transmitted from the particular remote station 110 to estimate a weight for the individual sample vector that jointly maximizes the energy of a sample vector that resulted from propagation of the signal from a remote station of the network 100 and minimizes the energy of a sample vector that resulted from interference with propagation of the signal from a remote station of the network 100 and thereby enhances detection of the received signal from which the sample vector is provided. The estimated weight is a vector of complex values that are constant. A preferred process for estimating the weight is described and claimed in a co-pending patent application entitled "Weighting a Signal Received by an Antenna Array to Enhance the Signal and Suppress Interference" being filed on even date herewith by James Covosso Francis, one of the co-inventors named in the present application. The content of said co-pending application is incorporated herein by reference.

The individual sample vectors 116 of the first group are processed with the respectively estimated weights to provide a first group of separately weighted sample vectors and the individual sample vectors 122 of the second group are processed with the respectively estimated weights to provide a second group of separately weighted sample vectors. The first group of separately weighted sample vectors is combined by summation to provide the first resultant sample vector 120; and the second group of separately weighted sample vectors is combined by summation to provide the second resultant sample vector 126.

In FIG. 11, a source of interference 132 is shown in the vicinity of the particular remote station 110 from which the signal is transmitted, with the interference source 132 being located between the remote station 110 and the second common region 108, but not between the remote station 110 and the first common region 104. In view of the location of the interference source 132 relative to the first common region 104 and the second common region 108, the weights estimated for the respective sample vectors 116 of the first group provided from the first array of antennas 112 in the first common region 104 will better enhance detection of the received signal than will the weights estimated for the respective sample vectors 122 of the second group provided from the second array of antennas 114 in the second common region 108. Thus by utilizing different arrays of antennas respectively located at spatially separated base stations in different common regions having different bearings with respect to a particular remote station, there is a greater probability of detecting the transmitted signal when there is a source of interference 132 between one, but not the other, of these regions 104, 108 and the particular remote station 110 from which the signal is transmitted. In other versions of this alternative embodiment, (a) all of the base stations of the network are included in a singular common region and only one resultant sample vector is provided to a signal processor for processing in the same manner as the signal processor 14 processes the sample vectors 29 provided thereto in the embodiment described above with reference to FIG. 5; and/or (b) the signal processor that processes the resultant sample vector(s) also processes in the same manner sample vectors that are not weighted and/or are not combined with other sample vectors to provide a resultant sample vector.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of communicating between stations in a radio network that includes at least one base station and at least one remote station, comprising the steps of:

(a) modulating a signal for transmission by embedding known information throughout the signal in a predetermined pattern;
(b) transmitting the modulated signal from a remote station of the network to at least one base station of the network;
(c) collecting a group of sample vectors of a signal received by at least one base station of the network; and
(d) processing the collected sample vectors with the known information in the predetermined embedding pattern in order to detect a said received signal that resulted from propagation of the transmitted signal;
wherein step (c) comprises the step of:
(e) collecting the group of sample vectors from signals that are received by more than one base station of the network; and/or the step of:
(f) collecting the group of sample vectors from signals that are received simultaneously at different frequencies by at least one base station of the network.

2. A method according to claim 1, further comprising of steps of:
(g) encoding the signal for transmission from a remote station of the network by processing the signal with a first feature; and
(h) processing the collected sample vectors of the received signal with a second feature that is related to the first feature in order to provide correlates of the received signal.

3. A method according to claim 2, wherein step (h) comprises the steps of:
(i) storing the received signal; and
(j) repeatedly processing the stored sample vector of the received signal with the second feature at progressively increasing lag times in order to provide a set of correlates of the received signal.

4. A method according to claim 3, wherein step (d) comprises the steps of:
(k) processing portions of a said correlate that occupy positions in the correlate corresponding to the positions of the known information in the modulated signal to estimate a frequency error present in the received signal and to provide a corrected known information sequence in accordance with the estimated frequency error; and
(l) processing the corrected known information sequence for the correlate to estimate whether a particular said correlate resulted from propagation from a remote station of the network of a signal that was modulated for transmission by embedding the known information throughout the signal in the predetermined pattern.

5. A method according to claim 2, wherein step (d) comprises the steps of:
(i) processing portions of a said correlate that occupy positions in the correlate corresponding to the positions of the known information in the modulated signal to estimate a frequency error present in the received signal and to provide a corrected known information sequence in accordance with the estimated frequency error; and
(j) processing the corrected known information sequence for the correlate to estimate whether a particular said correlate resulted from propagation from a remote station of the network of a signal that was modulated for transmission by embedding the known information throughout the signal in the predetermined pattern.

6. A method according to claim 5, wherein when it is estimated that the particular correlate resulted from said propagation of a said modulated signal from a remote station of the network, the method further comprises the steps of:

(k) processing the corrected known information sequence for the particular correlate to provide an indication of a residual error between the known information and the received signal for the portions of the particular correlate containing the known information;
(l) processing portions of the particular correlate that occupy positions in the correlate corresponding to the positions of the unknown information in the modulated signal in accordance with the estimated frequency error to thereby provide a corrected unknown information sequence;
(m) processing the corrected unknown information sequence of the particular correlate to provide a set of indications of residual errors between the received signal and different possible combinations of unknown information for the portions of the particular correlate containing the unknown information;
(n) combining the residual error indications for the known information portions of the Correlate with the each of the respective residual error indications for the unknown information portions of the particular correlate to provide a set of combined residual error indications for the sample vector of the received signal that was processed to provide the particular correlate;
(o) for all of the collected sample vectors, accumulating the combined residual error indications for all of the particular correlates for which it is estimated that the to particular correlate resulted from said propagation of a said modulated signal from a remote station of the network; and
(p) processing the accumulated residual error indications to select the corrected unknown information sequence for one particular correlate for providing the unknown information from the received signal.

7. A method according to claim 1, wherein step (c) comprises the step of:
(e) collecting the group of sample vectors from signals that are received by more than one base station of the network.

8. A method according to claim 7, wherein step (e) comprises the steps of:
(g) collecting at least some of the sample vectors from a signal that is received by a plurality of antennas respectively disposed at a plurality of spatially separated base stations; and
(h) processing the sample vectors that are collected pursuant to step (g) to provide a resultant sample vector; and
wherein step (d) comprises the step of:
(i) processing at least the resultant sample vector with the known information in the predetermined embedding pattern in order to detect a said received signal that resulted from propagation of the transmitted signal.

9. A method according to claim 8, wherein step (h) comprises the steps of:
(j) separately processing each individual sample vector collected pursuant to step (g) to estimate a weight for the individual sample vector that jointly maximizes the energy of a sample vector that resulted from propagation of the signal from a remote station of the network and minimizes the energy of a sample vector that resulted from interference with propagation of the signal from the remote station of the network;
(k) processing the individual sample vectors with the respectively estimated weights to provide a group of separately weighted sample vectors; and
(l) combining the group of separately weighted sample vectors to provide the resultant sample vector.

10. A method according to claim 7, wherein step (e) comprises the steps of:
- (g) collecting some of the sample vectors from a signal that is received by a plurality of antennas respectively disposed at a first plurality of spatially separated base stations that are located in a first common region; and
- (h) processing the sample vectors that are collected pursuant to step (g) to provide a first resultant sample vector; and
- (i) collecting some of the sample vectors from a signal that is received by a plurality of antennas respectively disposed at a second plurality of spatially separated base stations that are located in a second common region that is separated from the first common region and disposed at a different bearing than the first region with respect to the remote station from which the received signal was transmitted; and
- (j) processing the sample vectors that are collected pursuant to step (i) to provide a second resultant sample vector; and
- wherein step (d) comprises the step of;
- (k) processing at least the first and second resultant sample vectors with the known information in the predetermined embedding pattern in order to detect a said received signal that resulted from propagation of the transmitted signal.

11. A method according to claim 1, wherein step (c) comprises the step of:
- (f) collecting the group of sample vectors from signals that are received simultaneously at different frequencies by at least one base station of the network.

12. A method according to claim 1, wherein step (b) comprises transmitting the modulated signal over a high frequency (HF) channel.

13. A method according to claim 1, wherein step (b) comprises transmitting the modulated signal during the operation of an Automatic Link Establishment (ALE) protocol.

14. A method according to claim 1, wherein step (b) comprises transmitting the modulated signal during the operation of an Automatic Repeat reQuest (ARQ) protocol.

15. A method according to claim 1, wherein step (b) comprises transmitting the modulated signal during the operation of a hybrid ARQ protocol.

16. A method according to claim 1, wherein the base stations are synchronized in time and frequency to reduce the computational load.

17. A method according to claim 1, wherein the base stations are multi-channel capable and can allocate idle capacity to aid in signal capture.

18. A method of communicating between stations in a radio network that includes at least one base station and at least one remote station, comprising the steps of:
- (a) modulating a signal for transmission by embedding known information throughout the signal in a predetermined pattern;
- (b) encoding the signal for transmission from a remote station of the network of the network by processing the signal with a first feature;
- (c) transmitting the modulated and encoded signal from the remote station of the network;
- (d) collecting a group of sample vectors of a signal received by at least one base station of the network;
- (e) processing the collected sample vectors of the received signal with a second feature that is related to the first feature in order to provide correlates of the received signal;
- (f) processing portions of a said correlate that occupy positions in the correlate corresponding to the positions of the known information in the modulated signal to estimate a frequency error present in the received signal and to provide a corrected known information sequence in accordance with the estimated frequency error; and
- (g) processing the corrected known information sequence for the correlate to estimate whether a particular said correlate resulted from propagation from a remote station of the network of a signal that was modulated for transmission by embedding the known information throughout the signal in the predetermined pattern.

19. A method according to claim 18, wherein only when it is estimated that the particular correlate resulted from said propagation of a said modulated signal from a remote station of the network, the method further comprises the step of:
- (h) further processing said particular correlates to provide a frequency-error-corrected unknown information sequence for each particular correlate and to select the frequency-error-corrected unknown information sequence for one particular correlate for providing the unknown information from the received signal.

20. A method according to claim 18, wherein step (e) comprises the steps of:
- (i) storing a said sample of the received signal; and
- (j) repeatedly processing the stored sample of the received signal with the second feature at progressively increasing lag times in order to provide a set of correlates of the received signal.

21. A system for collecting and processing signals communicated between stations in a radio network that includes at least one base station and at least one remote station, wherein the signals were modulated for transmission from a remote station of the network by embedding known information throughout the signals in a predetermined pattern, the system comprising:
- means for collecting a group of sample vectors of a signal received by at least one base station of the network; and
- means for processing the collected sample vectors with the known information in the predetermined embedding pattern in order to detect a said received signal that resulted from propagation of a said transmitted modulated signal;
- wherein the means for collecting the group of sample vectors are adapted for (a) collecting the group of sample vectors from signals that are received by more than one base station of the network; and/or (b) collecting the group of sample vectors from signals that are received simultaneously at different frequencies by at least one base station of the network.

22. A system according to claim 21, wherein the signal was encoded for transmission from a remote station of the network by processing the signal with a first feature and wherein the processing means further comprise:
- means for processing the collected sample vectors of the received signal with a second feature that is related to the first feature in order to provide correlates of the received signal.

23. A system according to claim 22, wherein the means for processing the collected sample vectors to provide said correlates comprise:
- means for storing the received signal; and
- means for repeatedly processing the stored sample of the received signal with the second feature at progressively increasing lag times in order to provide a set of correlates of the received signal.

24. A system according to claim 22, wherein the processing means further comprise:
- means for processing portions of a said correlate that occupy positions in the correlate corresponding to the positions of the known information in the modulated signal to estimate a frequency error present in the received signal and to provide a corrected known information sequence in accordance with the estimated frequency error; and
- means for processing the corrected known information sequence for the correlate to estimate whether a particular said correlate resulted from propagation from a remote station of the network of a signal that was modulated for transmission by embedding the known information throughout the signal in the predetermined pattern.

25. A system according to claim 21, wherein the processing means further comprise:
- means for processing portions of a said correlate that occupy positions in the correlate corresponding to the positions of the known information in the modulated signal to estimate a frequency error present in the received signal and to provide a corrected known information sequence in accordance with the estimated frequency error; and
- means for processing the corrected known information sequence for the correlate to estimate whether a particular said correlate resulted from propagation from a remote station of the network of a signal that was modulated for transmission by embedding the known information throughout the signal in the predetermined pattern.

26. A system according to claim 21, wherein the means for collecting the group of sample vectors are adapted for collecting the group of sample vectors from signals that are received by more than one base station of the network.

27. A system according to claim 21, wherein the means for collecting the group of sample vectors are adapted for collecting the group of sample vectors from signals that are received simultaneously at different frequencies by at least one base station of the network.

28. A system for processing a group of sample vectors of signals collected from at least one base station of a radio network that also includes at least one remote station, wherein the signals were modulated for transmission by embedding known information throughout the signals in a predetermined pattern and encoded for transmission from a remote station of the network by processing the signal with a first feature, the system comprising means for collecting a group of sample vectors of a signal received by at least one base station of the network, the system comprising:
- means for processing the collected sample vectors of the received signal with a second feature that is related to the first feature in order to provide correlates of the received signal;
- means for processing portions of a said correlate that occupy positions in the correlate corresponding to the positions of the known information in the modulated signal to estimate a frequency error present in the received signal and to provide a corrected known information sequence in accordance with the estimated frequency error; and
- means for processing the corrected known information sequence for the correlate to estimate whether a particular said correlate resulted from propagation from a remote station of the network of a signal that was modulated for transmission by embedding the known information throughout the signal in the predetermined pattern.

29. A system according to claim 28, wherein the means for processing the collected sample vectors to provide said correlates comprise:
- means for storing the received signal; and
- means for repeatedly processing the stored sample of the received signal with the second feature at progressively increasing lag times in order to provide a set of correlates of the received signal.

30. A non-transitory computer readable medium for use with one or more computers in a system for processing a group of sample vectors of signals collected from at least one base station of a radio network that also includes at least one remote station, wherein the signals were modulated for transmission by embedding known information throughout the signals in a predetermined pattern and encoded for transmission from a remote station of the network by processing the signal with a first feature, the system comprising signal processing means embodied in said one or more computers for processing the collected sample vectors, wherein the computer readable medium contains program instructions for causing the signal processing means to perform the steps of:
- (a) processing the collected sample vectors of the received signal with a second feature that is related to the first feature in order to provide correlates of the received signal; and
- (b) processing portions of a said correlate that occupy positions in the correlate corresponding to the positions of the known information in the modulated signal to estimate a frequency error present in the received signal and to provide a corrected known information sequence in accordance with the estimated frequency error; and
- (c) processing the corrected known information sequence for the correlate to estimate whether a particular said correlate resulted from propagation from a remote station of the network of a signal that was modulated for transmission by embedding the known information throughout the signal in the predetermined pattern.

31. A computer readable medium according to claim 30, wherein the computer readable medium contains program instructions for causing the signal processing means to perform the following steps when it is estimated that the particular correlate resulted from said propagation of a said modulated signal from a remote station of the network:
- (d) processing the corrected known information sequence for the particular correlate to provide an indication of a residual error between the known information and the received signal for the portions of the particular correlate containing the known information;
- (e) processing portions of the particular correlate that occupy positions in the correlate corresponding to the positions of the unknown information in the modulated signal in accordance with the estimated frequency error to thereby provide a corrected unknown information sequence;
- (f) processing the corrected unknown information sequence of the particular correlate to provide a set of indications of residual errors between the received signal and different possible combinations of unknown information for the portions of the particular correlate containing the unknown information;
- (g) combining the residual error indications for the known information portions of the correlate with the each of the respective residual error indications for the unknown information portions of the particular correlate to provide a set of combined residual error indications for the sample vector of the received signal that was processed to provide the particular correlate;

(h) for all of the collected sample vectors, accumulating the combined residual error indications for all of the particular correlates for which it is estimated that the particular correlate resulted from said propagation of a said modulated signal from a remote station of the network; and (i) processing the accumulated residual error indications to select the corrected unknown information sequence for one particular correlate for providing the unknown information from the received signal.

32. A computer readable medium according to claim 30, wherein the computer readable medium contains program instructions for causing the signal processing means to perform the following step only when it is estimated that the particular correlate resulted from said propagation of a said modulated signal from a remote station of the network:

(d) further processing said particular correlates to provide a frequency-error-corrected unknown information sequence for each particular correlate and to select the frequency-error-corrected unknown information sequence for one particular correlate for providing the unknown information from the received signal.

33. A computer readable medium according to claim 30, wherein step (a) comprises the steps of:

(e) storing a said sample of the received signal; and (f) repeatedly processing the stored sample of the received signal with the second feature at progressively increasing lag times in order to provide a set of correlates of the received signal.

* * * * *

UNITED STATES PATENT AND TRADEMARK OFFICE
CERTIFICATE OF CORRECTION

| | | |
|---|---|---|
| PATENT NO. | : 7,835,719 B1 | Page 1 of 1 |
| APPLICATION NO. | : 11/803554 | |
| DATED | : November 16, 2010 | |
| INVENTOR(S) | : James Covosso Francis et al. | |

It is certified that error appears in the above-identified patent and that said Letters Patent is hereby corrected as shown below:

column 6, line 26, "with:" should be --wit:-- column 9, line 49, "$s_o$" should be --$S_0$-- column 11, line 7, "(A*A)*" should be --$(A*A)^{-1}$-- column 13, line 24, "$39_{uKN}$" should be --$39_{UKN}$-- column 14, line 10, --...,-- should be inserted after --x2a,-- column 20, line 19, "Correlate" should be --correlate-- column 20, line 27, "to" should be omitted

Signed and Sealed this
Twenty-ninth Day of March, 2011

David J. Kappos
*Director of the United States Patent and Trademark Office*